(12) United States Patent
Brown et al.

(10) Patent No.: US 11,010,721 B1
(45) Date of Patent: May 18, 2021

(54) COMPUTER-BASED PLATFORMS OR SYSTEMS, COMPUTING DEVICES OR COMPONENTS AND/OR COMPUTING METHODS FOR TECHNOLOGICAL APPLICATIONS INVOLVING PROVISION OF A PLATFORM WITH PORTALS FOR PROCESSING AND HANDLING ELECTRONIC REQUESTS

(71) Applicant: Capital One Services, LLC, McLean, VA (US)

(72) Inventors: Courtney Allison Brown, McLean, VA (US); Diane Gregorio, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/737,376

(22) Filed: Jan. 8, 2020

(51) Int. Cl.
  *G06F 17/00* (2019.01)
  *G06Q 10/10* (2012.01)
  *G06F 40/174* (2020.01)

(52) U.S. Cl.
  CPC ....... *G06Q 10/1057* (2013.01); *G06F 40/174* (2020.01); *G06Q 10/1093* (2013.01)

(58) Field of Classification Search
  CPC .............. G06Q 10/101; G06Q 10/1057; G06F 40/174; G06F 40/14
  USPC ................................ 715/200, 234, 221–225
  See application file for complete search history.

(56) References Cited

U.S. PATENT DOCUMENTS

| | | | |
|---|---|---|---|
| 8,121,953 B1* | 2/2012 | Orttung ............... | G06Q 10/1095 705/35 |
| 9,734,467 B2* | 8/2017 | Mashiach ............ | G06Q 30/04 |
| 2005/0097571 A1* | 5/2005 | Uguccioni ........... | G06Q 10/02 719/318 |
| 2011/0040598 A1* | 2/2011 | Brady ................. | G06Q 10/0631 705/7.13 |
| 2012/0036440 A1* | 2/2012 | Dare ................... | G06F 9/452 715/734 |
| 2012/0036442 A1* | 2/2012 | Dare ................... | G06F 8/60 715/736 |
| 2014/0172483 A1* | 6/2014 | Bellers ............... | G06Q 10/1095 705/7.16 |
| 2015/0089353 A1* | 3/2015 | Folkening ........... | G06F 8/38 715/234 |
| 2020/0242689 A1* | 7/2020 | Steinbarth .......... | G06Q 30/0185 |

* cited by examiner

*Primary Examiner* — Manglesh M Patel
(74) *Attorney, Agent, or Firm* — Greenberg Traurig, LLP

(57) ABSTRACT

Systems and methods associated with providing portals that processes electronic requests as well as generates and displays associated data are disclosed. In one embodiment, an exemplary method may comprise providing a portal comprising user interfaces configured to receive inputs from members of an organization and process related information, utilizing iframes in the portal to integrate forms from different applications within the organization that have different computing platforms, generating an intake request dashboard for the members comprising an intake form and a cost estimator tool, and generating an approver dashboard comprising an interactive user interface that displays integrated information regarding events to an approver and a UI mechanism for approving the electronic request.

20 Claims, 24 Drawing Sheets

Estimated Total Cost from the travel estimator?

*No response*

John Smith Travel to XYZ Conference in Las Vegas, NV

Dates Attending: [From] [To]

Estimated Flight/Transportation Cost: $1,850.00

Estimated Hotel Cost: $1,200.00

Estimated Food/Miscellaneous Cost: $600.00

Conference Price: $2,000.00

Total Travel Estimate: $3,850

| Prior Attendances | | |
|---|---|---|
| | Sally Jones 2018 | Fred Chi 2017 |
| Transportation | $1,750.00 | $1,700.00 |
| Hotel | $1,150.00 | $1,100.00 |
| Food/Misc. | $500.00 | $400.00 |
| Conference | $1,850.00 | $1,700.00 |
| Total | $5,250.00 | $4,900.00 |

[Approve Costs] [Approve Request]

| Step | User Action | Workflow Status |
|---|---|---|
| 1 | Associate submits a request via the intake form. | BACKLOG |
| 2 | Design Manager assigns the intake request to their Director to review the request. | IN PROGRESS |
| 3 | Director then either Approves or Rejects (Closes) the request.<br><br>Note: If CLOSING (ie. rejecting) the request, you will also need to change the status to "Won't Do". This is so we can track what conferences are being rejected. | APPROVED<br>or<br>CLOSED and Won't Do (Status) |
| 4 | If Approved, the status of the request stays as "Approved" in S/W until the associate completes both attending the learning experience AND does their share out / blog post. Once that is complete, either the Design Manager or the Director then changes the status to "Closed". | APPROVED → CLOSED |

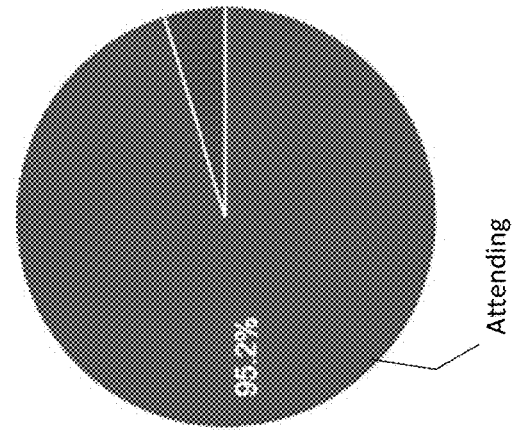
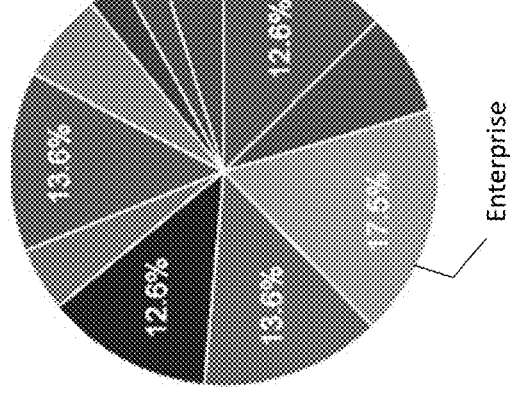
FIG. 6B

Description 103 responses

XXXX - Test Input

Test

Clarity is a design systems conference focused on how we work together. We provide tools and standards to scale across an increasing number of devices, platforms, and products. But real success comes when people align around a shared vision and language. Diverse perspectives for design, development, and product unite so more people can be a part of the conversation. At Clarity, we elevate our skills through multi-faceted inclusion, empathy, technology, creativity, and collaboration.

Test Description

Test 2

Test 3

Test for Filtering

Discover how the visionaries and leaders behind the world's most iconic organizations design and deliver breakthrough customer, employee, product, and brand experiences.

1.0 About the Conference:
The Conference for Research on Choreographic Interfaces (CRCI) was founded by Sydney Skybetter at Brown

FIG. 6D

Travel Estimator:

Enter Conference Travel Information

Conference Location: | Las Vegas | Nevada | USA
Traveling From: | City | State/Province | Country Dates Attending: From — To August
 1  2  3
 4  5  6  7  8  9 10
11 12 13 14 15 16 17
18 19 20 21 22 23 24
25 26 27 28 29 30 31

Estimated Flight/Transportation Cost: $

Estimated Hotel Cost: $ per day | Total

Estimated Food/Miscellaneous Cost: $

Conference Price: $

Total Travel Estimate: $

FIG. 6F

Estimated Total Cost from the travel estimator?

103 responses

John Smith Travel to XYZ Conference in Las Vegas, NV

Dates Attending: [From] [To]

Estimated Flight/Transportation Cost: $1,850.00

Estimated Hotel Cost: $1,200.00

Estimated Food/Miscellaneous Cost: $600.00

Conference Price: $2,000.00

Total Travel Estimate: $3,850

| | Prior Attendances | |
|---|---|---|
| | Sally Jones 2018 | Fred Chi 2017 |
| Transportation | $1,750.00 | $1,700.00 |
| Hotel | $1,150.00 | $1,100.00 |
| Food/Misc. | $500.00 | $400.00 |
| Conference | $1,850.00 | $1,700.00 |
| Total | $5,250.00 | $4,900.00 |

[Approve Costs] [Approve Request]

FIG. 6G

Why do you want to attend?

100 responses

XXXX - Test Input

Test answer.

Test 2

Test3

Test for Filtering

I'd love to attend this conference. The line up is amazing. Oprah & President Obama are keynote speakers and the breadth of additional speakers will be inspiring to say the least. I'm an avid Qualtrics user and have developed working relationships with a few of their staff. I'm excited about this conference more so than I have been about other conferences and look forward to attending (pending approval of course).

test

Test

CRCI is bringing together a strong intersection of performance, technology, AI/ fairness in ethics. THis is what we need to index higher on I'm a remote worker

COMPUTER-BASED PLATFORMS OR SYSTEMS, COMPUTING DEVICES OR COMPONENTS AND/OR COMPUTING METHODS FOR TECHNOLOGICAL APPLICATIONS INVOLVING PROVISION OF A PLATFORM WITH PORTALS FOR PROCESSING AND HANDLING ELECTRONIC REQUESTS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC., All Rights Reserved.

FIELD OF TECHNOLOGY

The present disclosure generally relates to an improved computer-based platform or system, improved computing components and devices and/or improved computing methods configured for one or more novel technological applications involving a platform with portals comprising features and functionality for processing and handling electronic requests.

BACKGROUND OF TECHNOLOGY

A computer network platform or system may include a group of computers (e.g., clients, servers, smart routers, etc.) and other computing hardware devices that are linked together through one or more communication channels to facilitate communication, account management and/or electronic handling.

SUMMARY OF DESCRIBED SUBJECT MATTER

In some embodiments, the present disclosure provides various exemplary technically improved computer-implemented methods for improving an organization's processing and technical handling of electronic requests received from members of the organization, such as electronic requests regarding attendance of events, including a method having steps such as:

providing, by at least one computer, a portal comprising user interfaces and a plurality of input fields configured to receive inputs from members of an organization regarding requests for member participation in events and processing information related to the member participation that enables the organization to: (i) assemble graphical information and insights used in approving requests, and (ii) track benefits of the member participation for both the members and the organization;

utilizing, by the at least one computer, iframes in the portal to integrate forms from different applications within the organization that have different computing platforms, wherein the iframes enable the forms to be directly embedded within the portal without direct linking to the different computing platforms;

generating, by the at least one computer, as part of the portal, an intake request dashboard for the members comprising:
   (i) an intake form with one or more first input fields comprising UI elements by which a member may provide identifying information regarding: an event in which the member seeks to participate, a location of the event, and a date range for the event;
   (ii) a cost estimator tool comprising one or more second input fields configured to receive cost information for: registration cost to attend the conference, travel cost for travel to and from the conference, and lodging cost to attend the conference; and generating, by the at least one computer, as part of the portal, an approver dashboard that provides, to an approver, one or more of: the identifying information, the cost information, at least one UI tool that enables the approver to automatically reformat and integrate data from other applications within the organization for display in the approver dashboard, and a UI mechanism to approve the intake request;

wherein the approver dashboard is configured to display graphical information to the approver regarding the intake request, the graphical information comprising:
   (i) first graphical indicia that displays first information regarding into which groups or departments of the organization previously-granted requests fall;
   (ii) second graphical indicia that displays, for the previously-granted requests, which skills of the members are being developed by participating in the events associated with in the previously-granted requests;
   (iii) a user interface for tracking intake requests, the user interface displaying status of pending intake requests from the members; and
   (iv) third graphical indicia that provides a visual display of the status of the pending intake requests.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web application, that include or involves features, functionality, computing components and/or steps consistent with any set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 5 is a chart illustrating exemplary actions taken by the individuals associated with the electronic requests herein, consistent with exemplary aspects of certain embodiments of the present disclosure.

DETAILED DESCRIPTION

Figure 1:
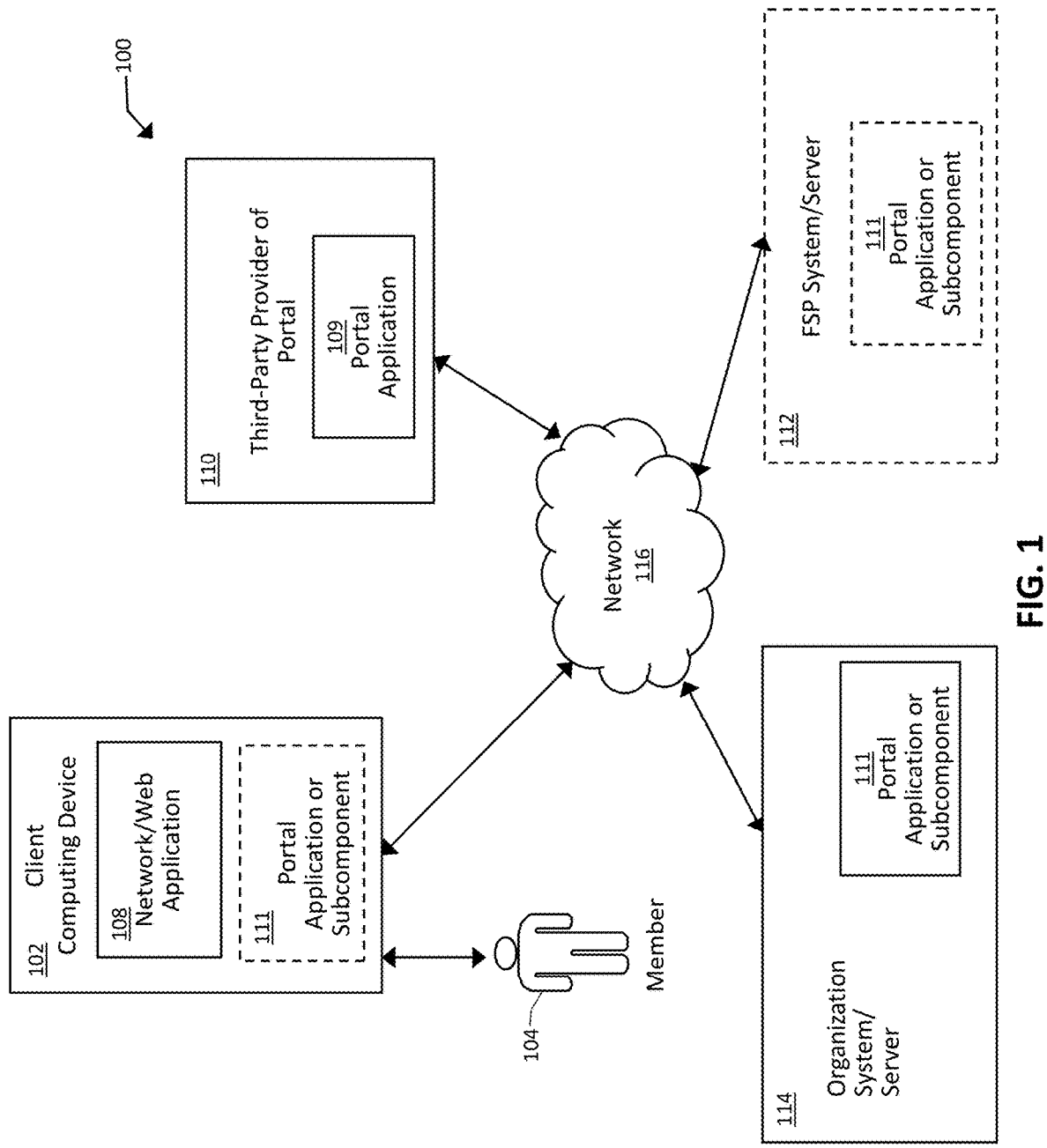
FIG. 1 is a block diagram of an exemplary system and/or platform involving features of processing and handling electronic requests, consistent with exemplary aspects of certain embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Aspects of the present innovations relate to a computer-generated portal comprising user interfaces configured to receive inputs from members of an organization regarding requests for member participation in events and process information related to the member participation that enables the organization to: (i) assemble graphical information and insights used in approving requests, and (ii) track benefits of the member participation for both the members and the organization, among other things. As described in more detail, below, certain user interfaces may be generated and displayed to the member submitting the request, and certain user interfaces may be generated and displayed to an approver and/or one or more reviewers from the organization. A high-level overview of the workflow occurring at these two types of user interfaces follows, below.

Further, aspects of the innovations herein may involve various technical solutions required for communications between and utilization of different software applications within the organization. Additional details regarding such technical solutions are described below, in connection with FIG. 4.

Turning to the basic workflow of a member who wishes to submit a request to attend an event, the member may navigate to an intake request dashboard. This intake request dashboard may be part of a larger page or sub-portal that organizes and describes a large number of events and conferences that may be of interest to one or both of the member and the organization. When the member is ready to submit their request to attend an event, the member will navigate to a submission page that is reached via the intake request dashboard. The submission page may comprise an embedded form for the member to enter the details and cost information associated with attending the event, where the form is submitted to generate an electronic request, which is then processed in connection with the approver and/or reviewers.

One or more dashboards are also provided for approvers or reviewers of submitted events to process, analyze and approve such events. Approvers and reviewers may each navigate to separate pages that provide the associated features and functionality enabling them to perform their assigned tasks. The functionality provided to each such approver and/or reviewer may be filtered by the organization. For purpose of illustration herein, for example, various approver functionality is described in the context of an approver dashboard. However, in other embodiments, the approver functionality described herein may also be distributed to different dashboards and/or to disparate reviewers of submitted events.

In some embodiments, submitted events being processed may be displayed as UI elements arranged in rows, with various columns that provide summary information or insights as well as other columns for performing certain functions. Among other things, columns may be provided to display status of requests, approve requests, update requests, indicate whether or not follow-up workflow (such as sharing about the event) has been completed, links to the follow-up workflow such as slide decks or posts regarding an assigned sharing of the event, drop-down menus to enable the approver to mark requests as approved or declined and/or to mark tasks complete, and/or various other functionality set forth herein. Once a request is reviewed and the status is changed to approved or declined, embodiments herein may provide fully automated functionality to advise the members of the results of the review. If an event is approved, such automated functionality may also be configured to advise the member to proceed with purchasing their tickets and/or otherwise booking their travel, and also provide a summary (and automated reminders) regarding all follow-up workflow that the member needs to complete, such as sharing, after the event has been attended. Such automated functionality may include a link to a page by which such follow-up activity may be performed and automatically tracked such that the portal is electronically updated once the follow-up (e.g., share, post, etc.) is completed.

Turning back to the page or sub-portal configured to organize and describe a larger number of events (sometimes referred to as the "Pulse Page"), various features and functionality may be provided via such page. For example, such page may be configured so that users can familiarize themselves with upcoming conferences using the conference calendar, being able to filter by design skill, speakers, region or location, and/or other criteria. In some embodiments, such page may also provide the members with functionality to add upcoming events or conferences of which they are aware. Similarly, features may be included to allow members to add speaking engagements at conferences as well as to filter via this option to see others who are speaking. Here, embodiments that provide such tagging functionality further comprise electronic tagging, for all events to be filtered, the features of the events or conferences by which they are to be filtered.

FIG. 1 is a block diagram of an exemplary system and/or platform 100 involving features of processing electronic requests as well as generating and displaying associated information, in accordance with at least some disclosed embodiments. System 100 may be configured for executing one or more software applications, such as an application involving a portal for processing electronic requests (hereafter "portal application") and/or a network/web application, consistent with disclosed embodiments. As shown, system 100 may include a computing device 102, such as a client computing device, associated with a member 104. Computing device 102 may be configured to execute, among other programs, a network/web application 108 and a portal application 111. System 100 may further include a third-party computer or system 110 such as an entity that provides a portal application 109 for processing electronic requests herein, an organization 114, such as a system or server of an organization that wishes to provide a portal for processing electronic requests to its members and/or, optionally, a financial service provider (FSP) system 112 that may also wish to provide such a portal. As shown, computing device 102, third party 110, organization 114, and optional FSP system 112, may be communicatively coupled by a network 116. Various features, functionality and benefits of portal application application 109 may also be achieved via one or more portal applications or subcomponents 111 (hereafter "modules") within or executed by the client computing device 102, the organization 114 and the FSP system 114. For simplicity of explanation, the behavior of the behavior of such computer systems and/or subcomponents (i.e., 109 and 111) are generally discussed below by referring to just the "portal application."

While only one computing device 102, application 108, module 111, organization 114, third party 110, FSP system 112, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing the portal application 111 and/or the network/web application. One illustrative computing device 102 is further described below in connection with FIG. 3.

Network/web application 108 may be one or more software applications configured to perform operations consistent with providing network or web pages to the member, accessing the portal (via network or online), as set forth herein, as well as interacting with the portal application, and the like. Here, for example, network/web application 108 may be configured to provide various information, associated with accessing pages related to the member's 104 activity with the portal. Such processing may occur by or with a network/web application 108, locally, or the network/web application 108 may transmit requests to and/or operate with one or more other software applications and/or computing components to process the desired information. Network/web application 108 may also be hosted and/or operated, in whole or in part, by a network/web system and/or server, described below in connection with FIG. 2. Network/web application 108 is further described below in connection with FIG. 3.

Figure 6A:
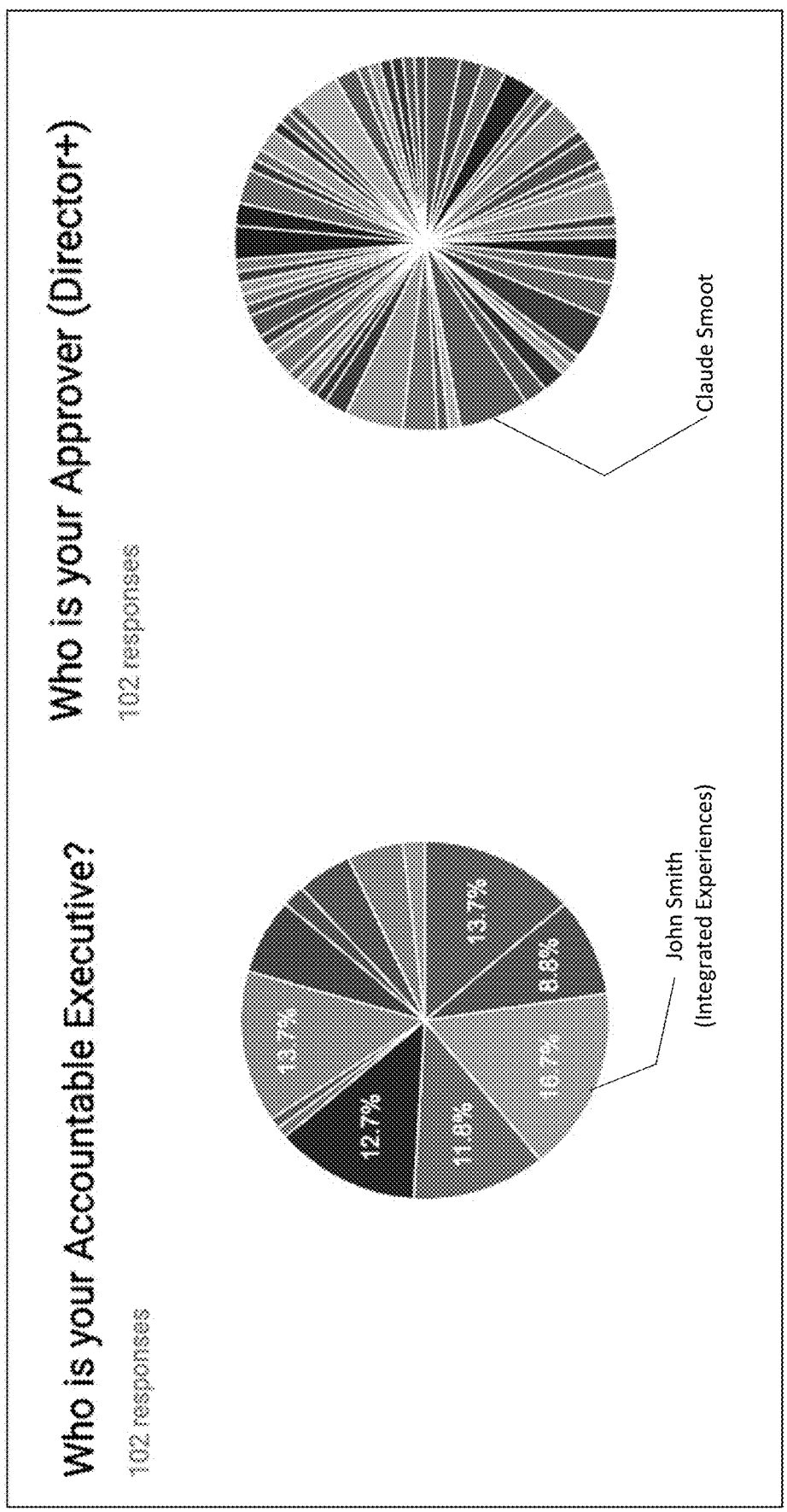
FIGS. 6A-6O are diagrams illustrating various user interfaces, features and functionality for submitting, processing and/or handling electronic requests, consistent with exemplary aspects of certain embodiments of the present disclosure.

Portal application 111 may be one or more software applications, modules, routines, subroutines and/or extensions configured to perform operations consistent with accessing, using and/or providing information related to the portal application 109, such as the features and functionality associated with the user interfaces shown and discussed further in connection with FIGS. 6A-6O.

Third party 110 may be an entity associated with one or more computing devices that are being operated to provide the portal application as a third-party provider (e.g., software as a service, etc.). However, the portal application 109 may also be provided internally by an entity wishing to provide such portal to its members, such as organization 114 and FSP system 112.

Organization system or server 114 may be one or more computing devices configured to perform operations consistent with providing a portal to its members including features and functionality accessible by computing device 102 over network 116. For example, network or web pages may be provided at computing device 102 via the network/web application 108. The disclosed embodiments are not limited to any particular configuration of organization system 114.

Optional FSP system 112, which is an example of one organization, may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
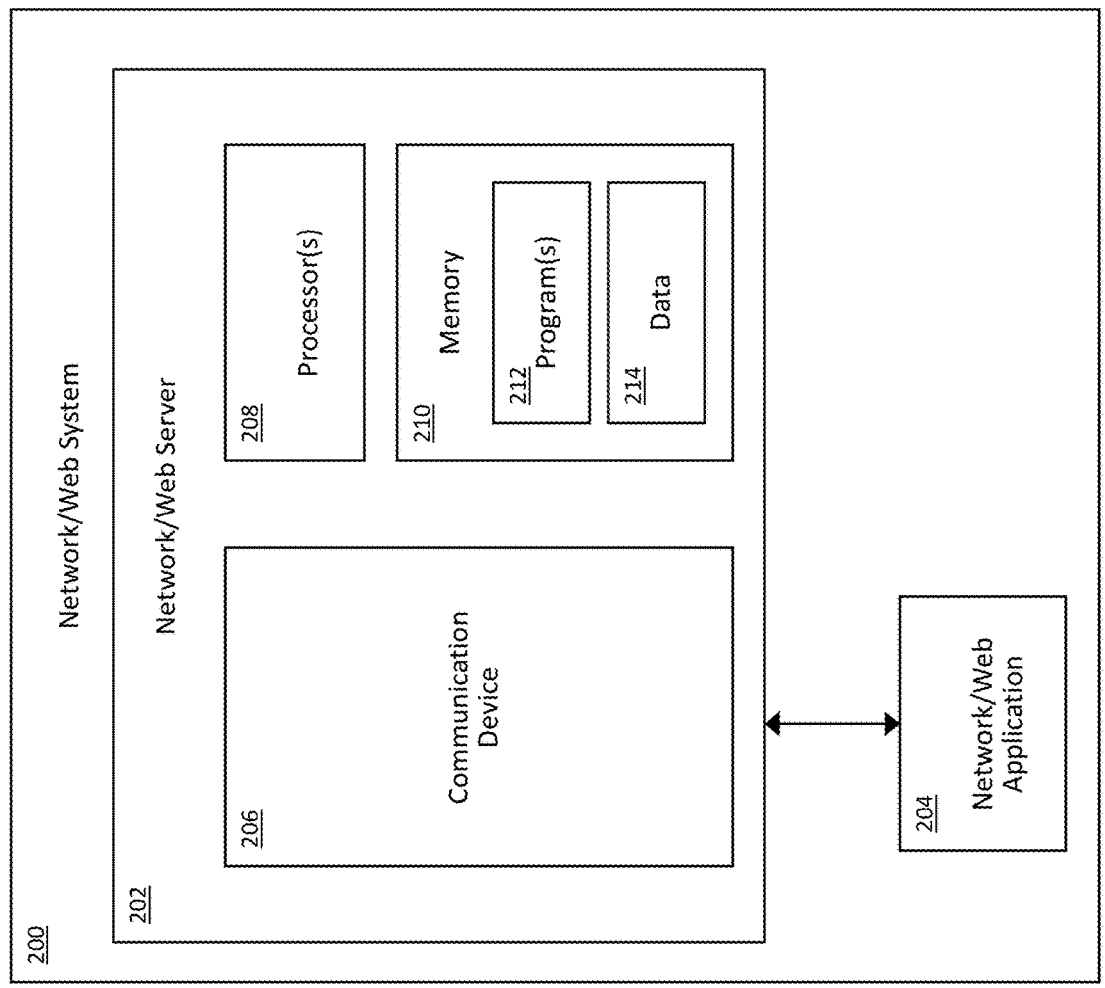
FIG. 2 is a block diagram of an exemplary system and/or platform involving features of processing and handling electronic requests, consistent with exemplary aspects of certain embodiments of the present disclosure.

FIG. 2 is a block diagram of an exemplary network/web system 200, in accordance with at least some disclosed embodiments. As shown, network/web system 200 may include network/web server 202 and network/web application 204. Network/web server 202 may include a communication device 206, one or more processor(s) 208, and memory 210 including one or more programs 212 and data 214. Network/web server 202 may be configured to perform operations consistent with providing features and functionality of the portal application 109 over one or more networks, such as an organization's intranet, the World Wide Web, etc.

Network/web server 202 may take the form of a server, general purpose computer, mainframe computer, or any combination of these components. Other implementations consistent with disclosed embodiments are possible as well. Network/web application 204 may take the form of one or more software applications stored on a computing device, such as network/web application 108 stored on computing device 102 described above.

Communication device 206 may be configured to communicate with one or more computing devices, such as computing device 102. In some embodiments, communication device 206 may be configured to communicate with the computing device(s) through network/web application 204. Network/web server 202 may, for example, be configured to provide instructions and/or operating information to network/web application 204 through communication device 206. Communication device 206 may be configured to communicate other information as well.

Communication device 206 may be further configured to communicate with one or more organizations 114, including exemplary FSP system 112 described above. Communication device 206 may be configured to communicate with such organizations in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor (s) otherwise configured to meet the computing demands required of different components of network/web system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. Such operations may include network/web activities as well as creation and/or transmission of related network/web attribute information. The disclosed embodiments are not limited to separate programs or computers configured to perform dedicated tasks. For example, memory 210 may include a single program 212 that performs the functions of network/web system 200, or program (s) 212 may comprise multiple programs. Memory 210 may also store data 214 that is used by program(s) 212.

In certain embodiments, memory 210 may store one or more sets of instructions involved with carrying out the processes described below in connection with FIG. 4. Other instructions are possible as well. In general, instructions may be executed by processor(s) 208 to perform one or more processes consistent with disclosed embodiments. In some embodiments, program(s) 212 may include one or more subcomponents configured to generate and/or process instructions and information for use by network/web application 204 in performing interactions and other activities associated with accessing the portal application 109.

The components of network/web system 200 may be implemented in hardware, software, or a combination of both hardware and software, as will be apparent to those skilled in the art. For example, although one or more components of network/web system 200 may be implemented as computer processing instructions, all or a portion of the functionality of network/web system 200 may be implemented instead in dedicated electronics hardware. In some embodiments, network/web system 200 may also be communicatively connected to one or more database(s) (not shown). Alternatively, such database(s) may be located remotely from network/web system 200. Network/web system 200 may be communicatively connected to such database(s) through a network, such as network 116 described above. Such database(s) may include one or more memory devices that store information and are accessed and/or managed through network/web system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
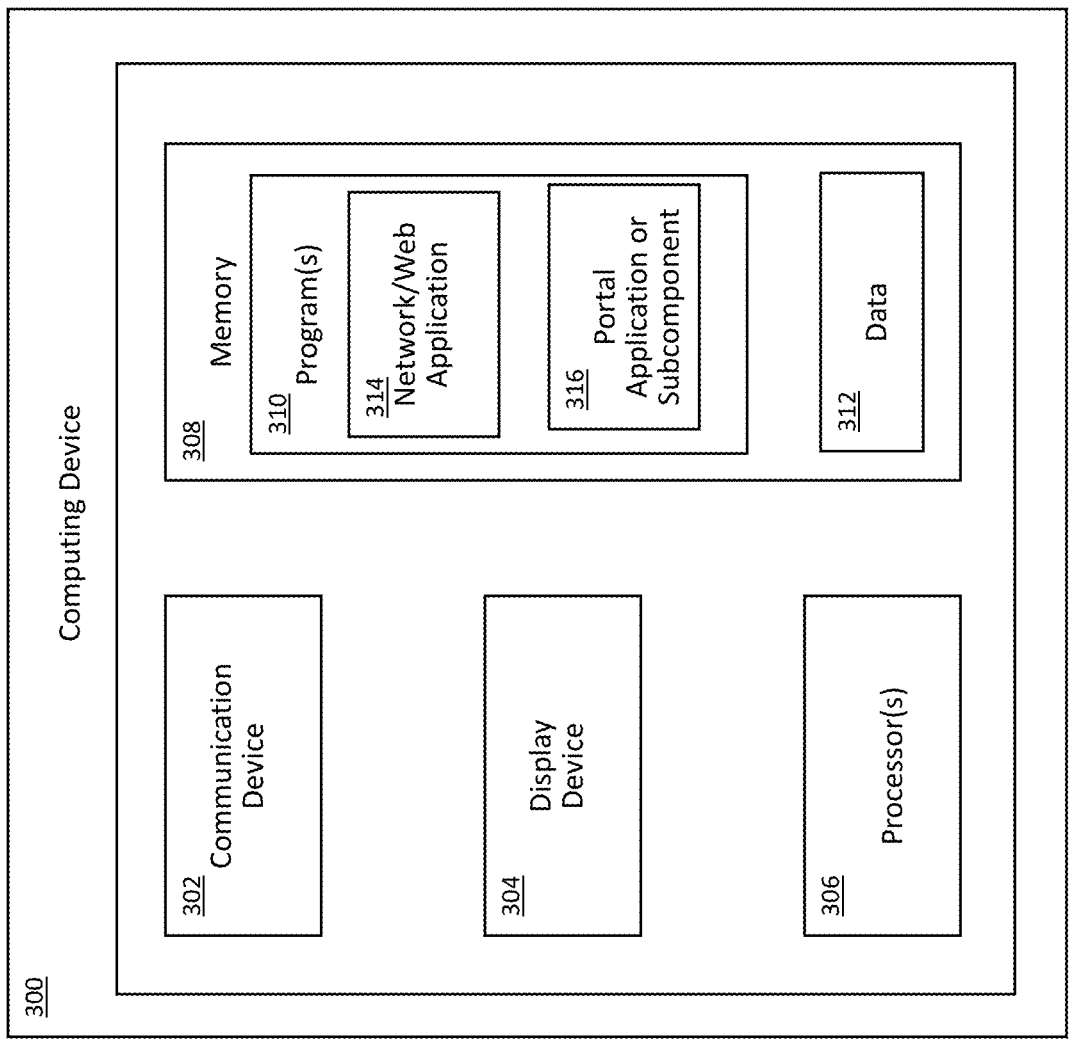
FIG. 3 is a block diagram of an exemplary computing device that may be associated with submitting, processing and/or handling electronic requests, consistent with exemplary aspects of certain embodiments of the present disclosure.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, network/web application 314 and portal application or subcomponent 316. In some embodiments, computing device 300 may take the form of a desktop or mobile computing device, such as a desktop computer, laptop computer, smartphone, tablet, or any combination of these components. Alternatively, computing device 300 may be configured as any wearable item, including jewelry, smart glasses, or any other device suitable for carrying or wearing on a person. Other implementations consistent with disclosed embodiments are possible as well. Computing device 300 may, for example, be the same as or similar to computing device 102 described above.

In the example embodiment shown, communication device 302 may be configured to communicate via one or more networks with the various computer systems and servers disclosed elsewhere herein. In some embodiments, communication device 302 may be further configured to communicate with one or more organizations. such as organization system 114 described above, including exemplary FSP system 112 described above. Communication device 302 may be configured to communicate with other components as well. Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, network and/or web pages provided by computing device 300 through network/web application 108. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out some processes performed in connection with FIG. 4. Other instructions are possible as well. In general, instructions may be executed by processor(s) 306 to perform one or more processes consistent with disclosed embodiments.

In some embodiments, program(s) 310 may include a network/web application 314. Network/web application 314 may be executable by processor(s) 306 to perform operations including, for example, providing pages associated with the portal for display. Such pages may be provided, for example, via display device 304. In some embodiments, the pages may be associated with a portal being provided by organization 114, such as exemplary FSP 112, third-party provider 110, and the like, described above. Network/web application 314 may be executable by processor(s) 306 to perform other operations as well. In some embodiments, program(s) 310 may further include a portal application or subcomponent 316. Portal application 316 may, for example, be the same as similar to portal applications 109 and/or 111, described above. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4:
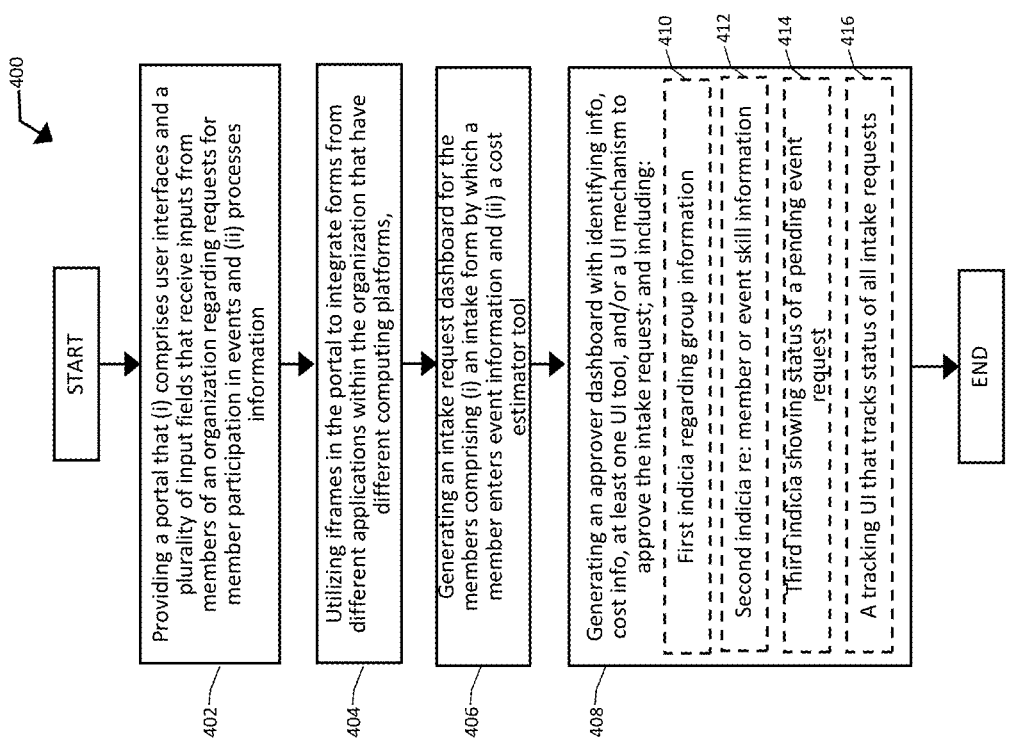
FIG. 4 is a flowchart illustrating one exemplary process related to providing a portal that processes and handles electronic requests, consistent with exemplary aspects of certain embodiments of the present disclosure.

FIG. 4 is a flowchart illustrating one exemplary process 400 related to processing electronic request information as well as generating and displaying associated data, consistent with exemplary aspects of at least some embodiments of the present disclosure. As shown in the exemplary flowchart of FIG. 4, request process 400 may comprise: providing a portal comprising user interfaces and a plurality of input fields configured to receive inputs from members of an organization regarding requests for member participation in events and process information related to the member participation that enables the organization to (i) assemble graphical information and insights used in approving requests and (ii) track benefits of the member participation for both the members and the organization, at 402; utilizing iframes (inline frames) in the portal to integrate forms from different applications within the organization that have different computing platforms, wherein the iframes enable the forms to be directly embedded within the portal without direct linking to the different computing platforms, at 404; generating an intake request dashboard for the members comprising (i) an intake form with one or more first input fields comprising UI elements by which a member may provide identifying information and (ii) a cost estimator tool, at 406; and generating an approver dashboard having (i) integrated information regarding events to an approver and (ii) a UI mechanism to approve the intake request, at 408. Further, in the step of generating the approver dashboard 408, the graphical information may include: (i) first graphical indicia that displays first information regarding into which groups or departments of the organization previously-granted requests fall, at 410; (ii) second graphical indicia that displays, for the previously-granted requests, which skills of the members are being developed by participating in the events associated with in the previously-granted requests, at 412; (iii) third graphical indicia that provides a visual display of the status of the pending intake requests, at 414; and (iv) a user interface for tracking intake requests, the user interface displaying status of pending intake requests from the members, at 416.

FIG. 5 is a chart illustrating exemplary actions taken by the individuals associated with the electronic requests herein, consistent with exemplary aspects of certain embodiments of the present disclosure. As a first step, at 510, a member of the organization (associate) submits an electronic request to attend an event via the intake form. Until processed, a pending request like this may appear in the portal, such as in the approver dashboard, as part of a 'backlog' of requests to process. According to some embodiments, a third party, such as a design manager, may assist in the processing of the event requests, typically as an intermediary between the member submitting the request and the approver who is assigned to review/approve the request. In such embodiments, as seen at 515, the intermediary (e.g., design manager) may assign an intake request to an approver, such as a director, to review the request. Once assigned, the request may appear in the portal as an 'in progress' request. Next, at 520, the approver or director may either approve or reject (close) the request, which may correlate to the request being shown as having a workflow status of 'approved' or 'closed' in the portal. In some embodiments, an additional status identifier, such as 'won't do', may be assigned to a rejected or closed request. Here, for example, assigning a status of 'won't do' can establish that the event is undesired, which may be utilized to assist in subsequent processing, such as with later requests regarding that same event. As shown at 525, the status of the request may be denoted as 'approved,' once it is authorized by the approver. Further, once the event is actually attended and any subsequent follow-up workflow completed, the approver or intermediary may then mark that request as 'closed.'.

As discussed in FIG. 4, in some embodiments, request process 400 may include, at 402, a step of providing a portal comprising user interfaces and a plurality of input fields configured to receive inputs from members of an organization regarding requests for member participation in events and processing information related to the member participation that enables the organization to (i) assemble graphical information and insights used in approving requests and (ii) track benefits of the member participation for both the members and the organization. Various examples of such user interfaces, input fields, as well as graphical information and insights are shown and described in connection with FIGS. 6A-6N, and/or disclosed elsewhere here.

In some embodiments, request process 400 may include, at 404, utilizing iframes in the portal to integrate forms from different applications within the organization that have different computing platforms, wherein the iframes enable the forms to be directly embedded within the portal without direct linking to the different computing platforms. Here, for example, the exemplary computing platforms of the present disclosure may be programmed to utilize an embedding process that utilizes iframe HTML elements, or any other similarly suitable elements of any other suitable markup computing language, to embed forms utilized by one or more external (e.g., non-integrated, unrelated) applications within a single unified interface of the exemplary portal described herein. In one illustrative embodiment, utilizing iframes in the portal to integrate forms from different applications may include: retrieving, by the at least one computer, for each of the forms, information from the different applications or the different computing platforms that is needed to generate each form; reformatting, by the at least one computer, the forms by integrating the information retrieved via HTML elements and thereby generating reformatted forms that do not access the different applications or the different computing platforms; and embedding, by the at least one computer, the reformatted forms within the portal such that the portal serves as a single unified interface that provides the forms in a directly usable format without any links to the different applications or the different computing platforms. In some embodiments, the exemplary computing platforms of the present disclosure may be programmed to perform such processing of iframes and/or iframe-like elements within forms to provide technical advantages, including avoiding drawbacks such as needing to link to and/or access different applications and different computing platforms when handling forms via the portal.

Table 1 shows an illustrative example of iframe-linking:

TABLE 1

<iframe src= . . . ></iframe>

In some embodiments, the exemplary computing platforms of the present disclosure may be programmed to utilize cascading style sheets (CSS) to dynamically adjust the format of each form being presented.

Further, the forms from the various, different applications that are automatically processed and integrated via the disclosed technology may be integrated into the platform by reformatting the forms such that the forms pass permissions existing between the disparate applications. Accordingly, by such reformatting, the portal is able to maintain consistent content within these forms and/or retrieved or provided by such reformatted forms, even upon passing though defense systems in place between the applications and/or between the applications and the portal.

In some embodiments, request process 400 may include, at 406, generating, as part of the portal, an intake request dashboard for the members, the intake request dashboard comprising: (i) an intake form with one or more first input fields comprising UI elements by which a member may provide identifying information regarding: an event in which the member seeks to participate, a location of the event, and a date range for the event; and (ii) a cost estimator tool comprising one or more second input fields configured to receive cost information for: registration cost to attend the conference, travel cost for travel to and from the conference, and lodging cost to attend the conference. An exemplary intake form used by a member to submit a request may include one or more first input fields for: event name, location of the event, the date range that the member wishes to attend the event, event web site, description or details of the event, names of the member's manager and/or the approver of the event request, group or line of business (LOB) of the member, whether the member will attend or speak at the event, one or more reasons why the member should attend the event, skills that the member will use or receive training on at the event, and the like. Various examples of user interfaces that assemble such information being input by the members, for display in aggregate for the approver, are shown in FIGS. 6A-6H.

The intake request dashboard also includes a cost estimator tool comprising one or more second input fields configured to receive cost information for: registration cost to attend the conference, travel cost for travel to and from the conference, and lodging cost to attend the conference. FIG. 6F depicts one illustrative user interface that includes an exemplary cost estimator tool 600 with various input fields to receive information regarding the event, such as a conference. As shown in FIG. 6F, exemplary cost estimator tool 600 may include fields for receiving a location of the conference 610 (and/or other information enabling an estimate of lodging costs), city from which the member will travel 620 (and/or other information enabling an estimate of flight or transportation costs), a date range that the member will attend the event 630, a field for the cost of the conference 640, and/or additional fields 650 for the member to enter cost information for food and/or other logistics or needs associated with attending the event. Alternately or in addition, the cost estimator tool may be configured such that the member simply enters the conference name or website, in response to which the cost estimator tool automatically determines desired inputs such as the location of the event, the cost of the event, travel or lodging costs associated with the event, and the like.

Figure 6C:
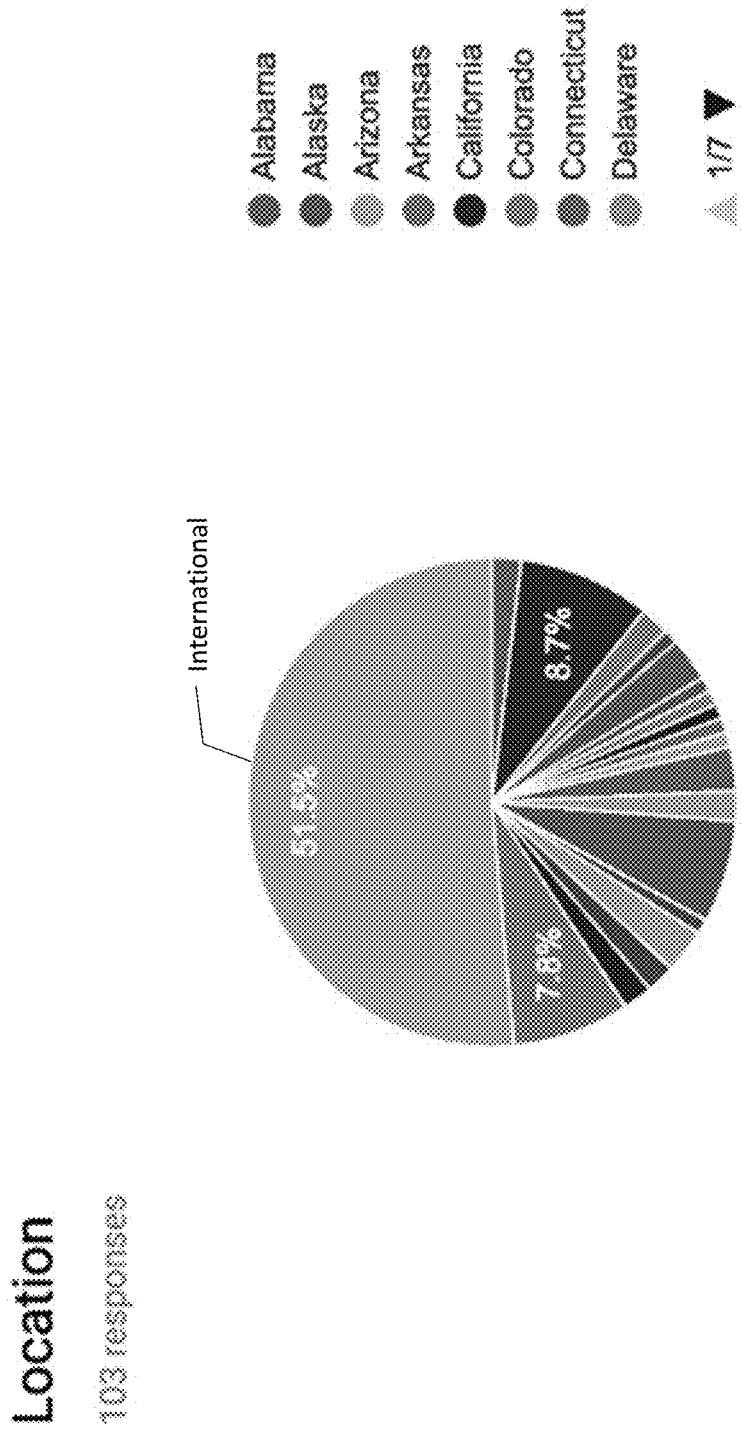
Figure 6E:
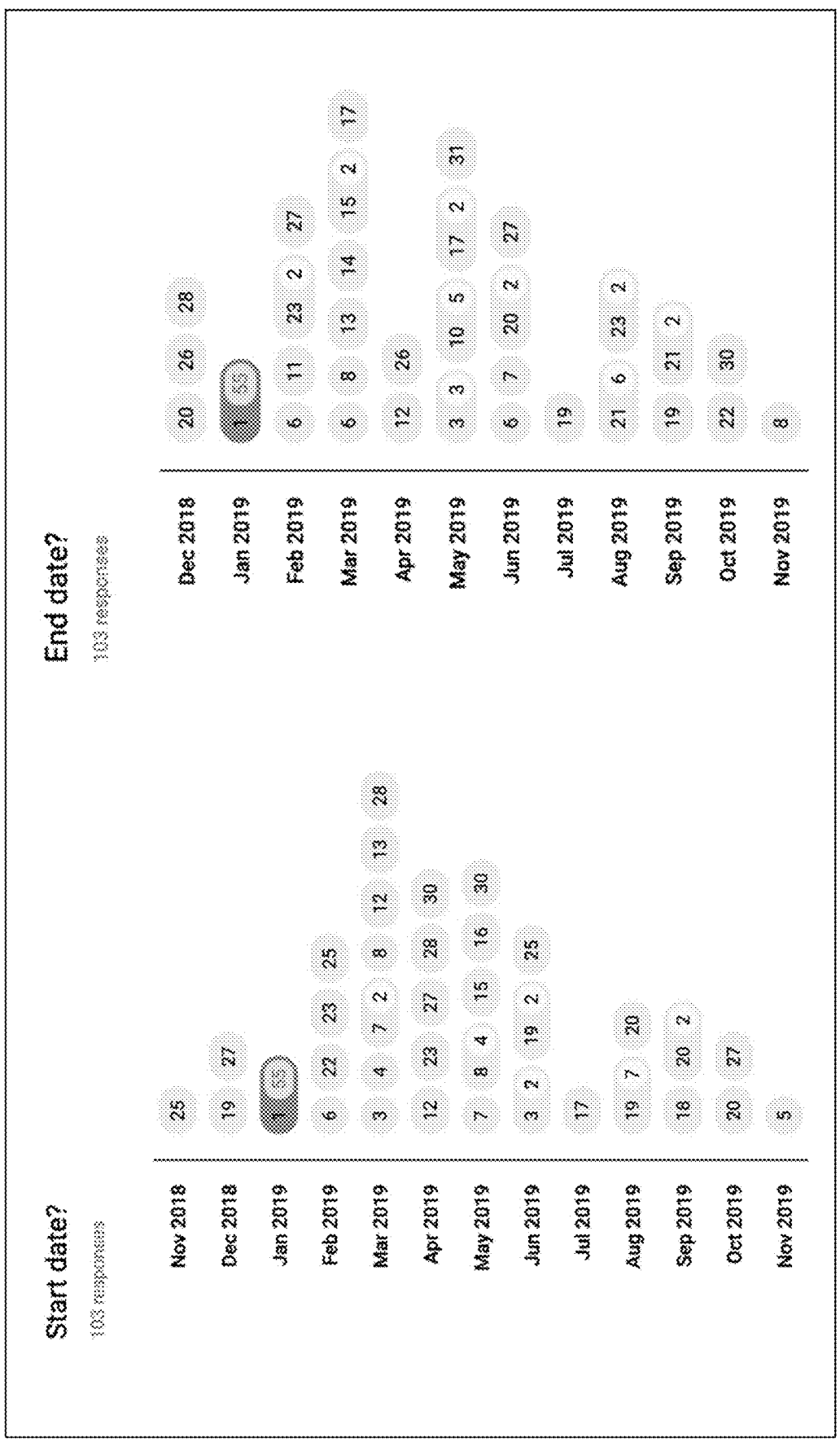

In some embodiments, request process 400 may include, at 408, generating, as part of the portal, an approver dashboard that provides, to an approver, one or more of: the identifying information, the cost information, at least one UI tool that enables the approver to automatically reformat and integrate data from other applications within the organization for display in the approver dashboard, and a UI mechanism to approve the intake request. Here, for example, the approver dashboard may display identifying information regarding the event or request such as shown in FIGS. 6A-6E and 6H-6I, cost information such as shown in FIG. 6G, and one or more UI tools that enable the approver to integrate data from other applications within the organization and display such information via the approver dashboard such as shown in FIGS. 6J-6K.

Further, the approver dashboard may be configured to display graphical information to the approver regarding the intake request, the graphical information comprising: (i) first graphical indicia, at 410, that displays first information regarding into which groups or departments of the organization previously-granted requests fall, such as shown in FIG. 6M; (ii) second graphical indicia, at 412, that displays, for the previously-granted requests, which skills of the members are being developed by participating in the events associated with in the previously-granted requests, such as shown in FIG. 6N; (iii) third graphical indicia, at 414, that provides a visual display of the status of the pending intake requests, such as shown in FIG. 6O; and (iv) a user interface, at 416, for tracking intake requests, the user interface displaying status of pending intake requests from the members, such as shown in FIG. 6L.

FIGS. 6A-6O are diagrams illustrating various user interfaces, features and functionality for submitting, processing and/or handling electronic requests, consistent with exemplary aspects of certain embodiments of the present disclosure.

As set forth above, embodiments herein may include generating one or more dashboards that provide, to an approver or to one or more reviewers, identifying information regarding the event or conference. FIG. 6A depicts a first example of a page containing such identifying information, for display to the approver or reviewer. The example page of FIG. 6A depicts a first graphical display, here pie chart, illustrating the accountable executive (e.g., bosses) associated with the members who have submitted the requests, as well as another graphical display, again pie chart, illustrating the approver (e.g., Director) associated with the submitted requests. FIG. 6B depicts a second example of a page containing identifying information, for display to the approver or reviewer. The example page of FIG. 6B depicts a first graphical display, here pie chart, illustrating the group or line of business (LOB) with which the members who have submitted the requests being summarized or analyzed are associated, as well as another graphical display, again pie chart, illustrating the distribution of the members, as between those attending their event and those speaking at their event, for the various requests being summarized or analyzed. FIG. 6C depicts a third example of a page containing identifying information, for display to the approver or reviewer. The example page of FIG. 6C depicts a graphical display, here pie chart and legend, illustrating the locations at which the various requests being summarized or analyzed are being held. FIG. 6D depicts another example of a page containing identifying information, for display to the approver or reviewer. The example page of FIG. 6D depicts a graphical display, here summary of descriptive information regarding the event, that provides a summary of specific textual information describing an event, such as an event associated with a request that is selected for closer review by the approver. FIG. 6E depicts another example of a page containing identifying information, for display to the approver or reviewer. The example page of FIG. 6E is a graphical display, here depicting start date and end date information, that provides the approver or reviewer with a graphical illustration of the dates that the members of the organization will be attending various events, such as a list of dates that the members associated with approved events will be absent from the organization attending their events.

As set forth above, embodiments herein may include generating an intake request dashboard, i.e. for members to submit electronic requests to attend events, that includes a cost estimator tool. FIG. 6F depicts an illustrative user interface showing an example cost estimator page via which the members may submit cost information regarding a proposed event they wish to attend. The example page of FIG. 6F depicts a user interface having fields for the member to enter the cost of the conference, conference location (arrival city), departure city, the dates that the member would attend, estimated flight or other transportation costs, estimated hotel costs, and/or other estimated costs such as expenses for food or other miscellaneous costs associated with attending the conference. The various costs may be entered by the member manually, or they may be automatically generated by the cost estimator tool, such as by accessing an existing travel web tool. Furthermore, as shown in FIG. 6G, information processed by the cost estimator tool may also be displayed to the approver in another user interface. FIG. 6G is one illustrative user interface, here, showing an example page that displays the calculated information as well as comparative information from other members who either wish to attend the same event or attended the same event, e.g., in a previous year. The approver page of the cost estimator tool, as shown in FIG. 6G, may also include one or more buttons for the approver to approve the event request, or to only approve the estimated/proposed costs.

FIG. 6H depicts another example of a page containing identifying information, for display to the approver or reviewer. The example page of FIG. 6H depicts a graphical display, here summary of the reasons a member provided as to why they should be approved to attend a desired event. An approver may wish to display such a page, for example, if he or she desires to more closely review an event and believes that these reasons may assist in approving or declining the electronic event request.

Figure 6I:
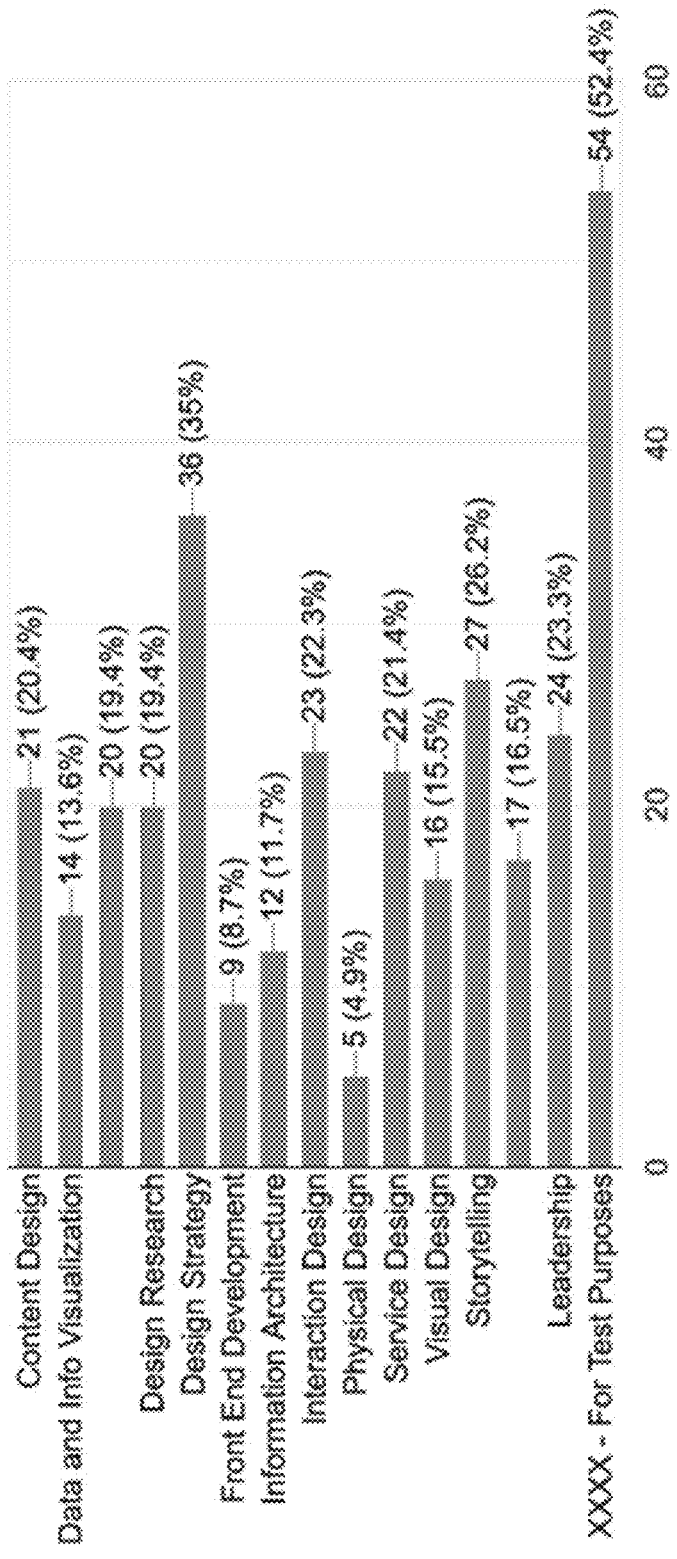
Figure 6J:
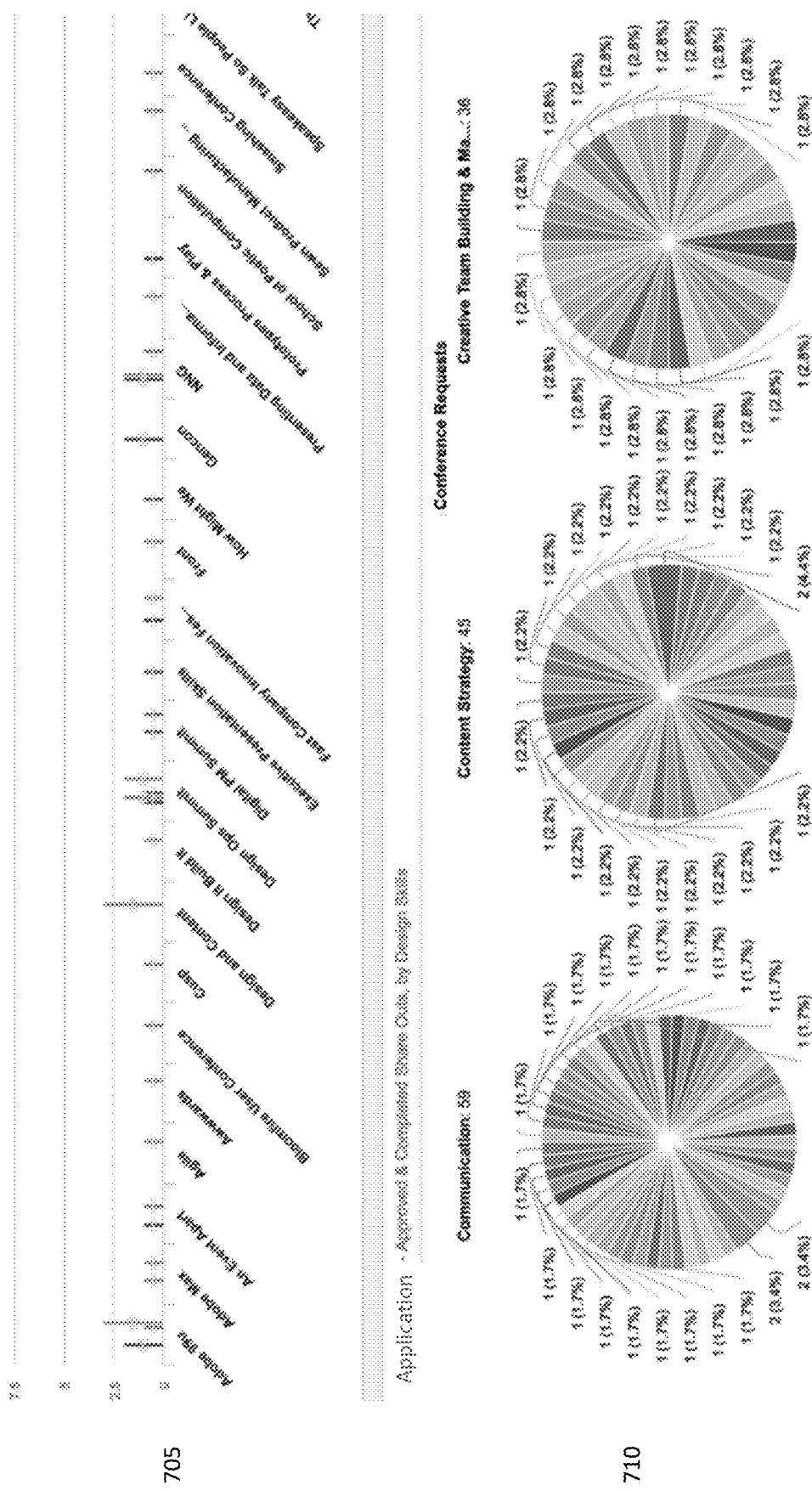
Figure 6K:
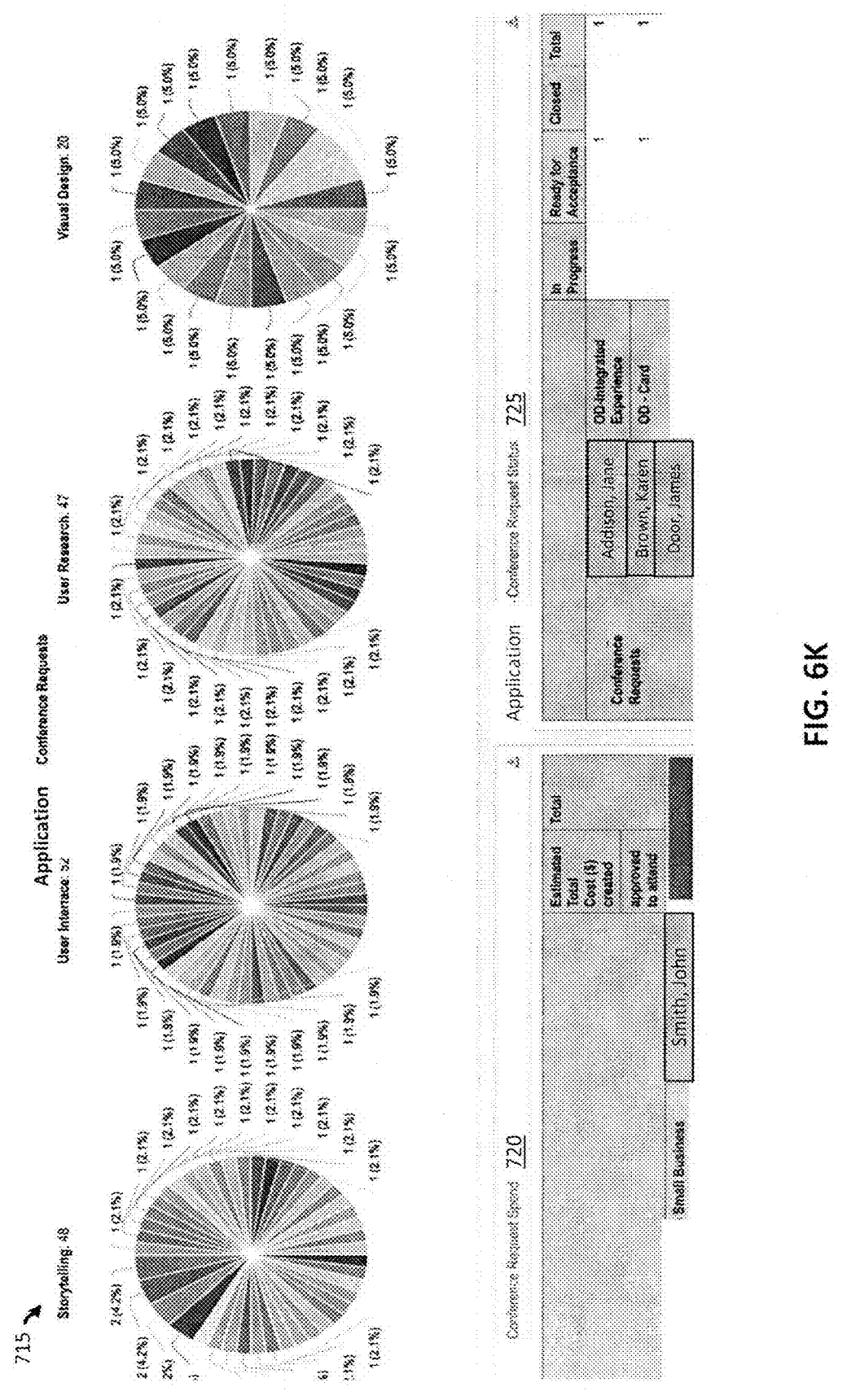
Figure 6L:
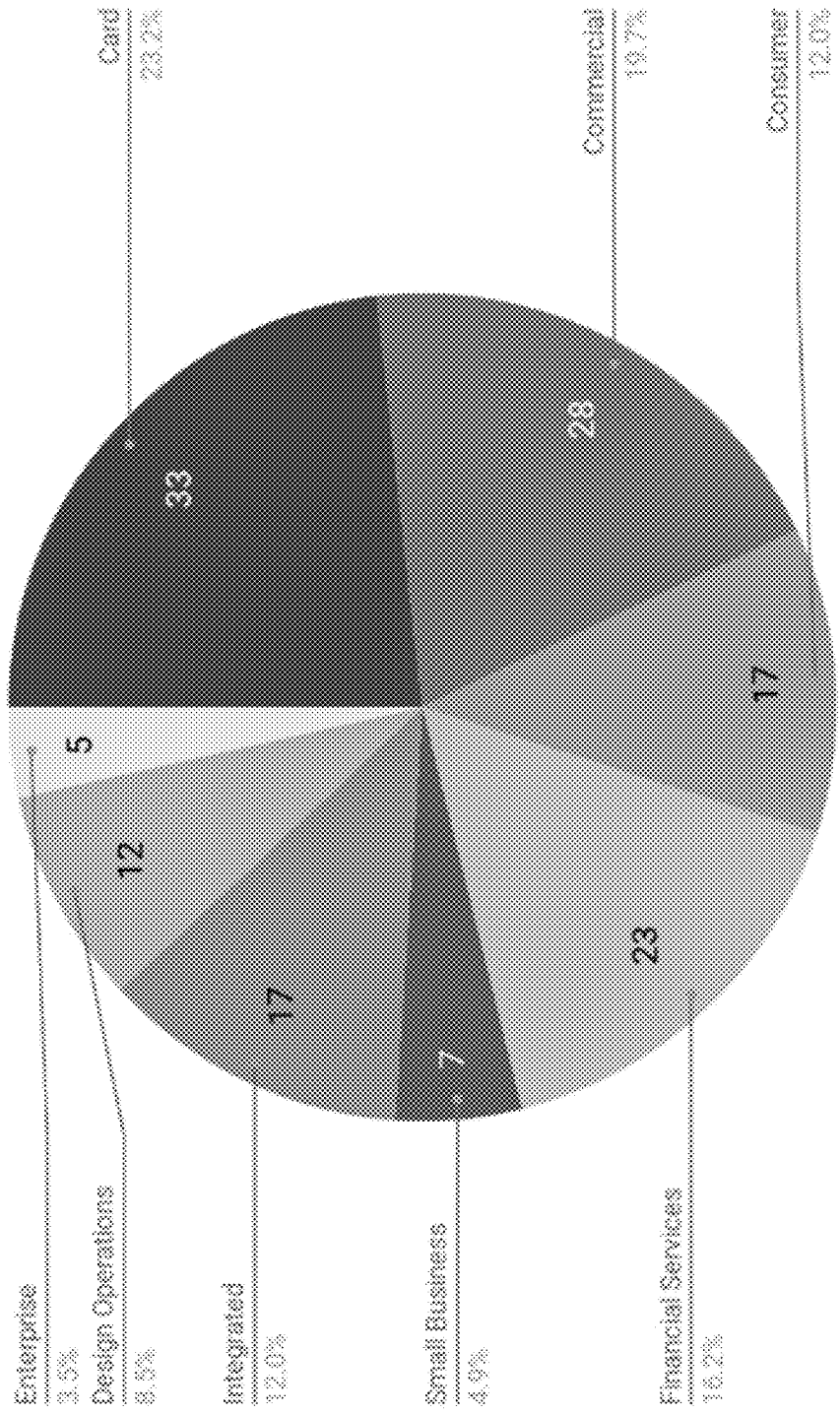
Figure 6M:
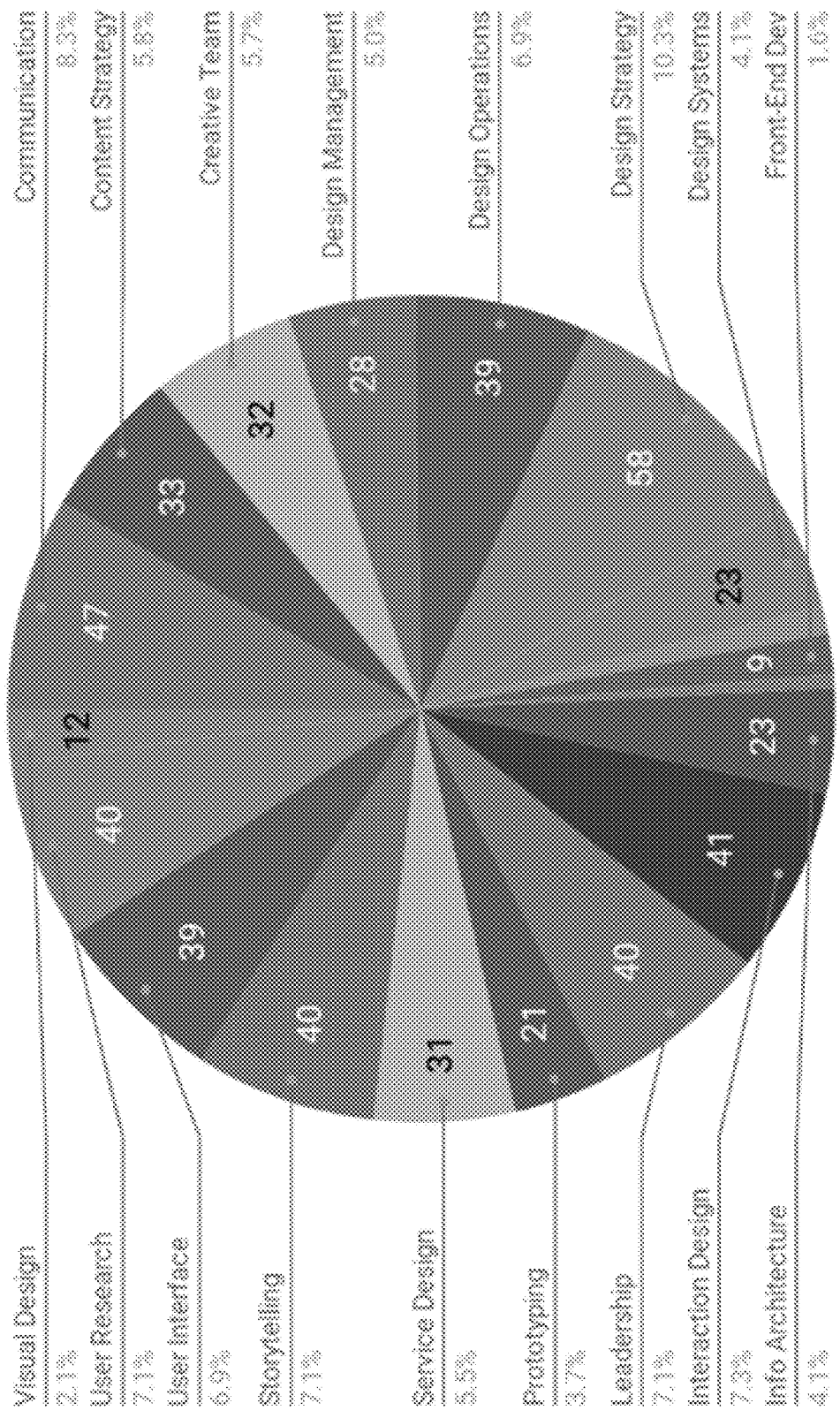
Figure 6N:
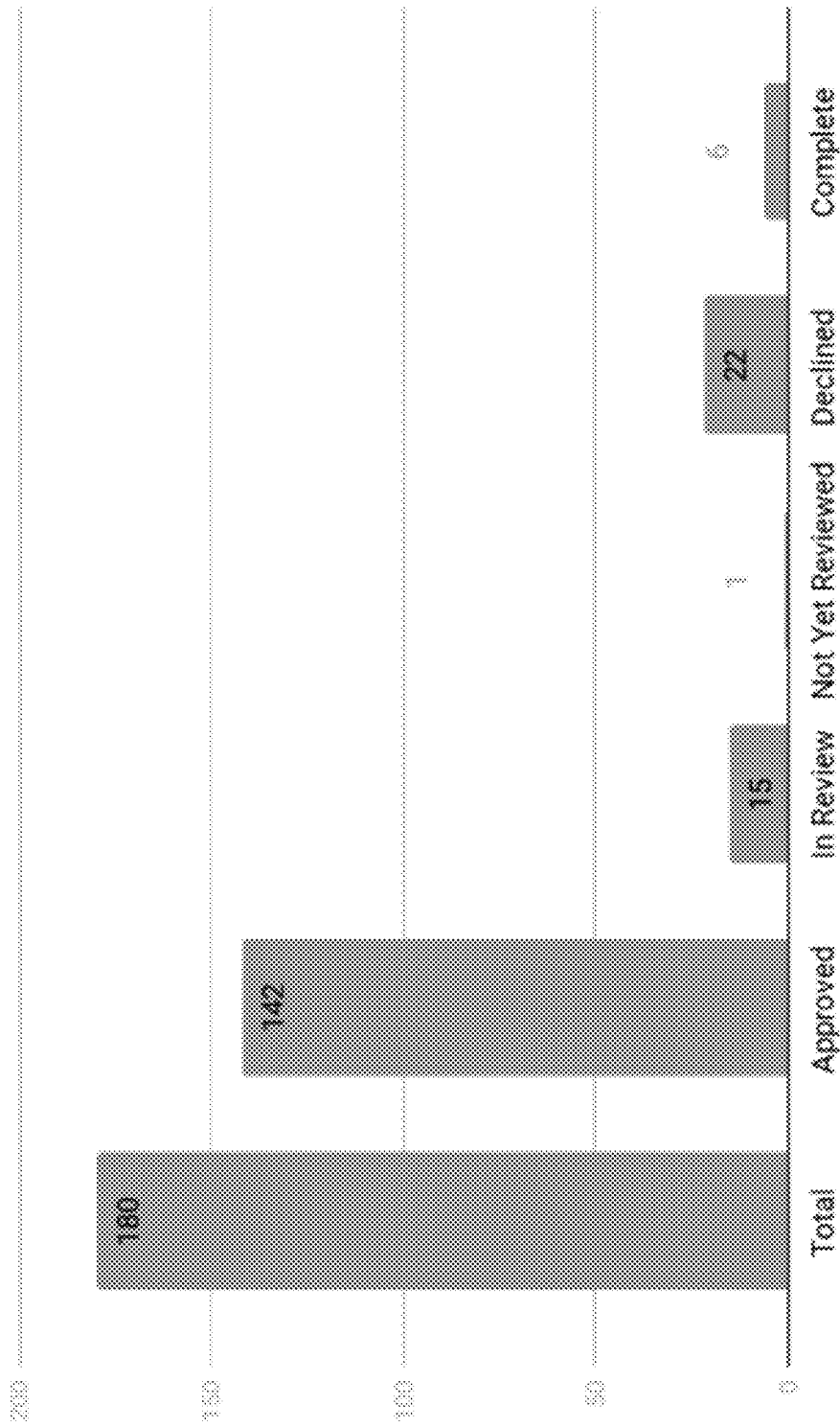
Figure 60:
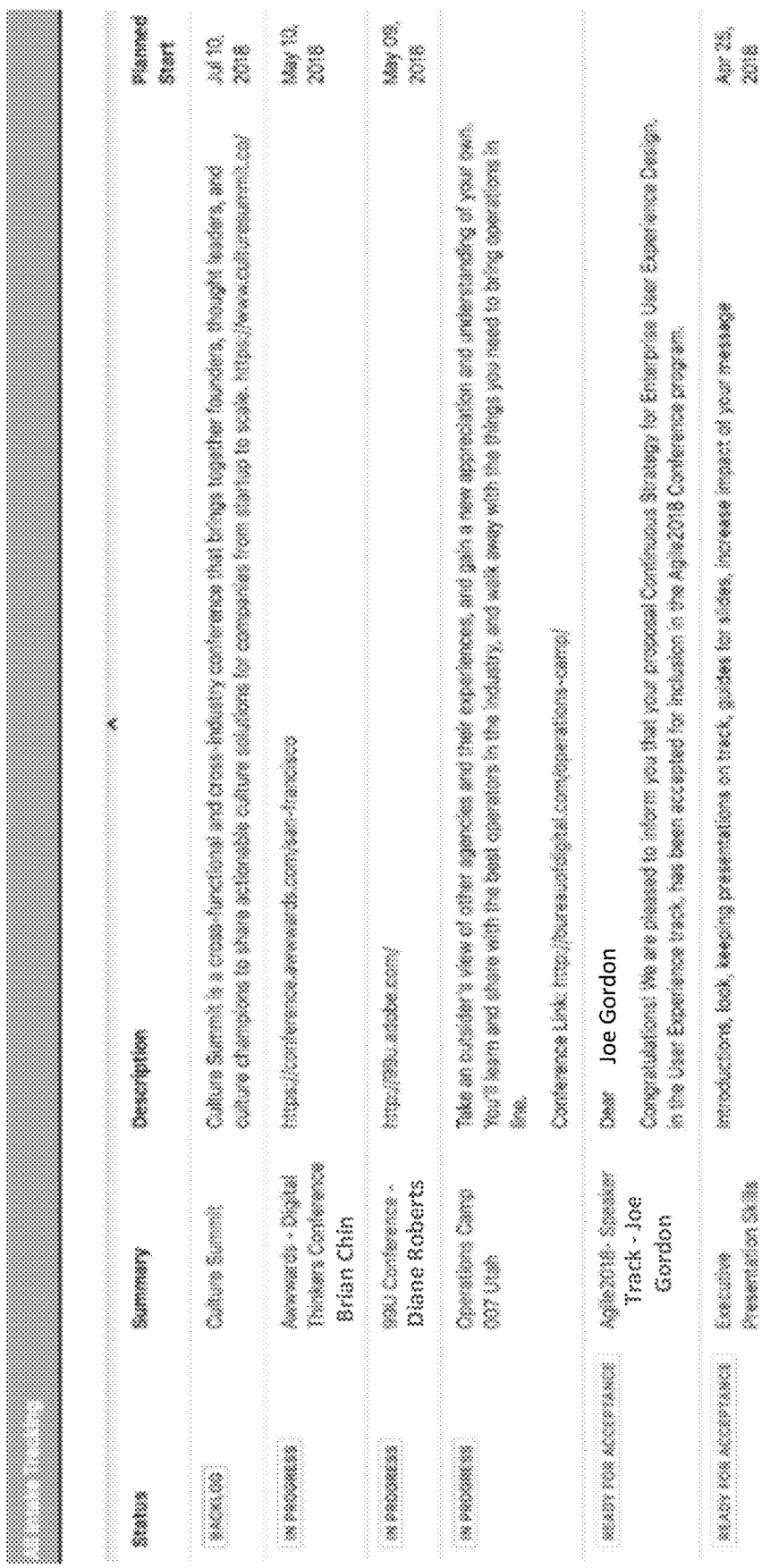

FIG. 6I depicts another example of a page containing identifying information, for display to the approver or reviewer. The example page of FIG. 6I depicts a graphical display, here a bar graph, that provides a reviewer or approval with a graphical summary of how skills, such as design skills that the member will learn or use at the event, compare against the various skills identified in events that have already been approved and/or are also under consideration. Such a page may also display skills that the organization has decided to either focus on or not pursue. Accordingly, such page may be utilized by an approver to approve events that yield development of skills that will more greatly benefit the organization, or are not already crowded by numerous attendees of approved events.

A dashboard, such as an approver dashboard, may also be provided with various UI (user interface) tools that enables the reviewer/approver to automatically reformat and integrate data from other applications or departments within the organization, for display and comparison or other analysis via the dashboard. FIGS. 6J-6K depict an example of such a UI tool, illustrating one illustrative UI tool that comprises a bar graph illustrating quantity of members attending a set of pending event requests being considered for approval, at 705, a series of pie charts illustrating the distribution of these pending event requests into various groups or business units of the organization, at 710, a summary of the costs or spend associated with this set of event requests, at 720, and an event tracking list that displays the status of each of the items in this set of pending event requests, at 725.

As part of generating an approver dashboard with identifying information, cost information, at least one UI tool, and/or a UI mechanism to approve the intake request, at 408, the approver dashboard is configured to display graphical information to the approver regarding the intake request, the graphical information comprising: first indicia regarding group information, at 410, second indicia regarding skill information associated with the members and/or events, at 412, third indicia showing status of a pending event request, at 414, and a tracking UI that tracks status of all subject intake requests, at 416. Various example user interfaces involved with displaying such graphical information are set forth in FIGS. 6L-6O. FIG. 6L depicts an example of a page containing first graphical indicia that displays first information regarding into which groups or departments of the organization subject event request fall, i.e., for display to the approver. Here, for example, subject event requests may be approved event requests, pending event requests, or the like. The example page of FIG. 6L shows first graphical indicia, here a pie chart, illustrating to the approver the groups and/or lines of business (LOB) into which the approved event requests fall. FIG. 6M depicts an example of a page containing second graphical indicia that provides graphical illustration regarding the skills of the members that would be developed by participating in the events, i.e., for display to the approver. The example page of FIG. 6M shows second graphical indicia, here a pie chart, illustrating the various design skills that are being developed via the approved event requests. FIG. 6N depicts an example of a page containing third graphical indicia that provides a visual display of the status of the pending event requests, i.e., for display to the approver. The example page of FIG. 6N shows third graphical indicia, here a bar graph, illustrating the total event requests that require approval, including details such as the quantity approved, quantity in review, quantity not yet reviewed, quantity declined, and quantity that are fully completed. FIG. 6O depicts an example of a user interface for tracking event requests (also called intake requests), the user interface displaying status of pending event requests from the members, i.e., for display to the approver. The example page of FIG. 6O shows an interactive user interface displaying a list of pending event requests in rows, and having columns of data or interactive UI elements for information or features such as: status, summary (e.g., name of the event), description (e.g., additional summary information or details to enable greater comprehension of the event), and/or a planned start date. Other columns may also be provided.

Figure 7:
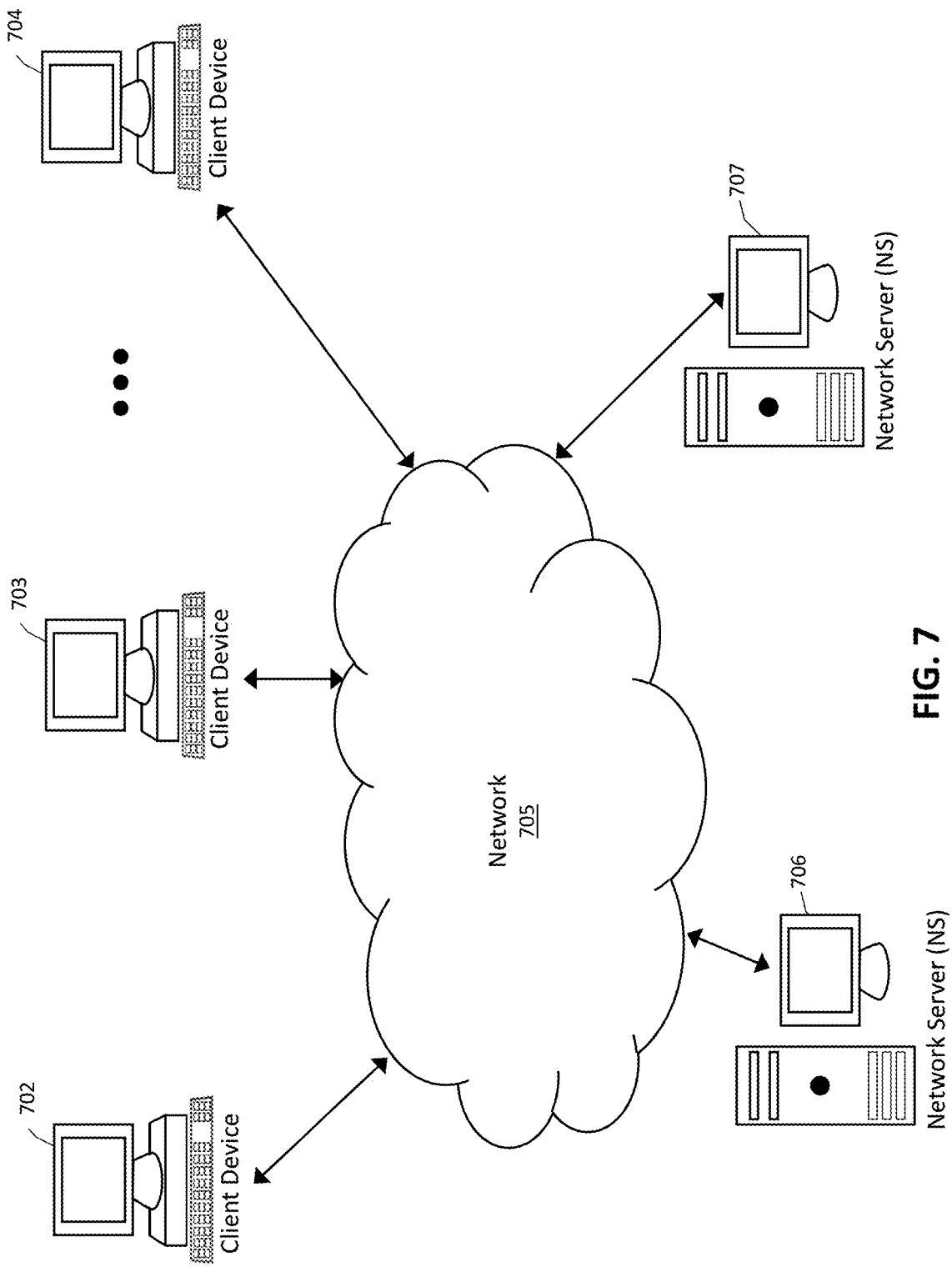
FIG. 7 is a block diagram depicting an exemplary computer-based system and/or platform, in accordance with certain embodiments of the present disclosure.

FIG. 7 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of members (e.g., clients, and their users) and/or concurrent interactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 7, members 702-704 (e.g., clients) of the exemplary computer-based system/platform may include virtually any computing device capable of receiving and sending a message over a network (e.g., organization intranet, cloud network, etc.), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed network/web browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 1, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 8:
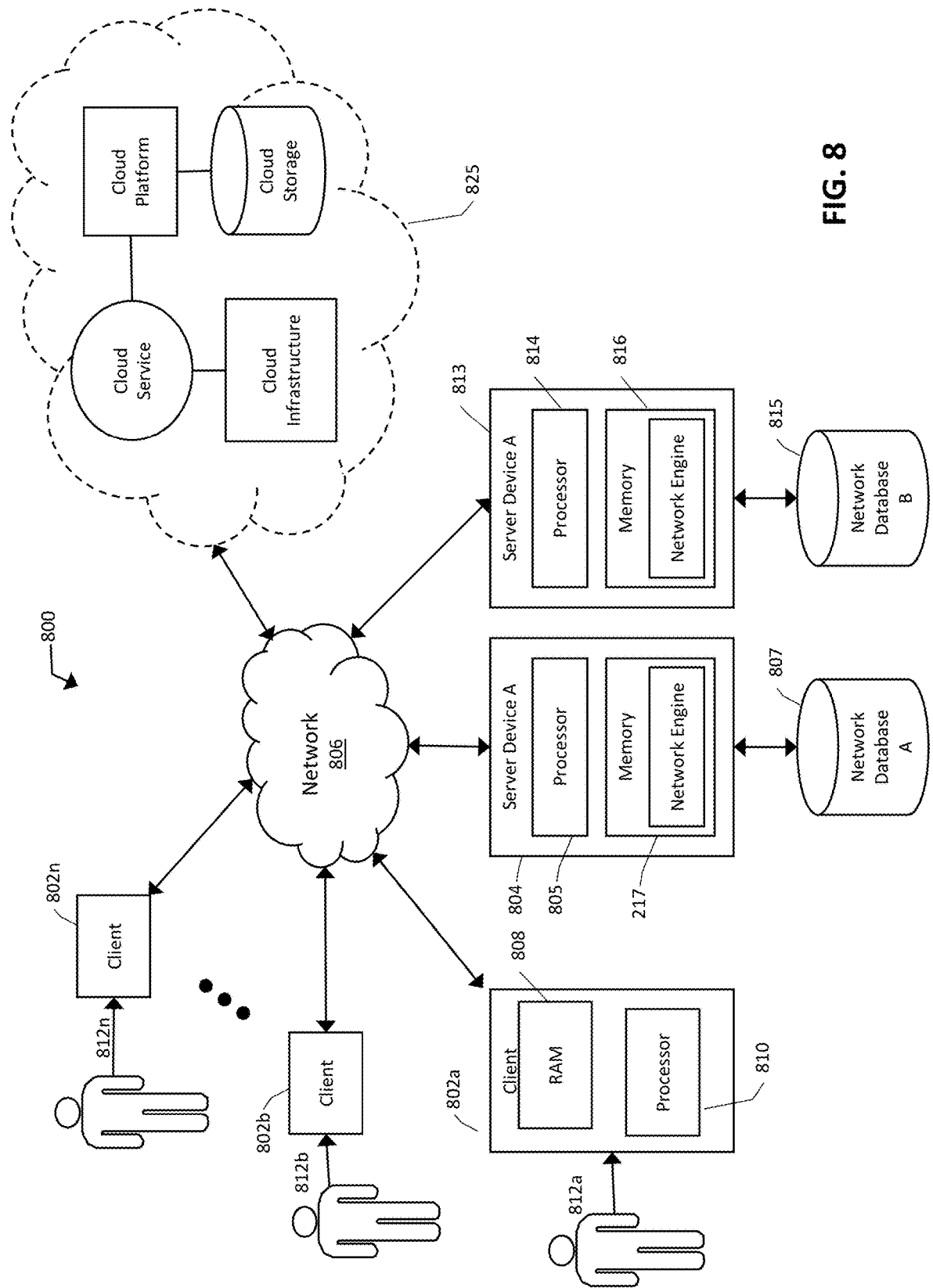
FIG. 8 is a block diagram depicting another exemplary computer-based system and/or platform, in accordance with certain embodiments of the present disclosure.

FIG. 8 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b thru 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a-n may also comprise a number of external or internal devices such as a mouse, a CD-ROM, DVD, a physical or virtual keyboard, a display, or other input or output devices. In some embodiments, examples of member computing devices 802a-n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a-n may be specifically programmed with one or more application programs in accordance with one or more principles/methodologies detailed herein. In some embodiments, member computing devices 802a-n may operate on any operating system capable of supporting a browser or browser-enabled application, such as Microsoft™, Windows™, and/or Linux. In some embodiments, member computing devices 802a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a-n, users, 812a-n, may communicate over the exemplary network 806 with each other and/or with other systems and/or devices coupled to the network 806. As shown in FIG. 8, exemplary server devices 804 and 813 may be also coupled to the network 806. In some embodiments, one or more member computing devices 802a-n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
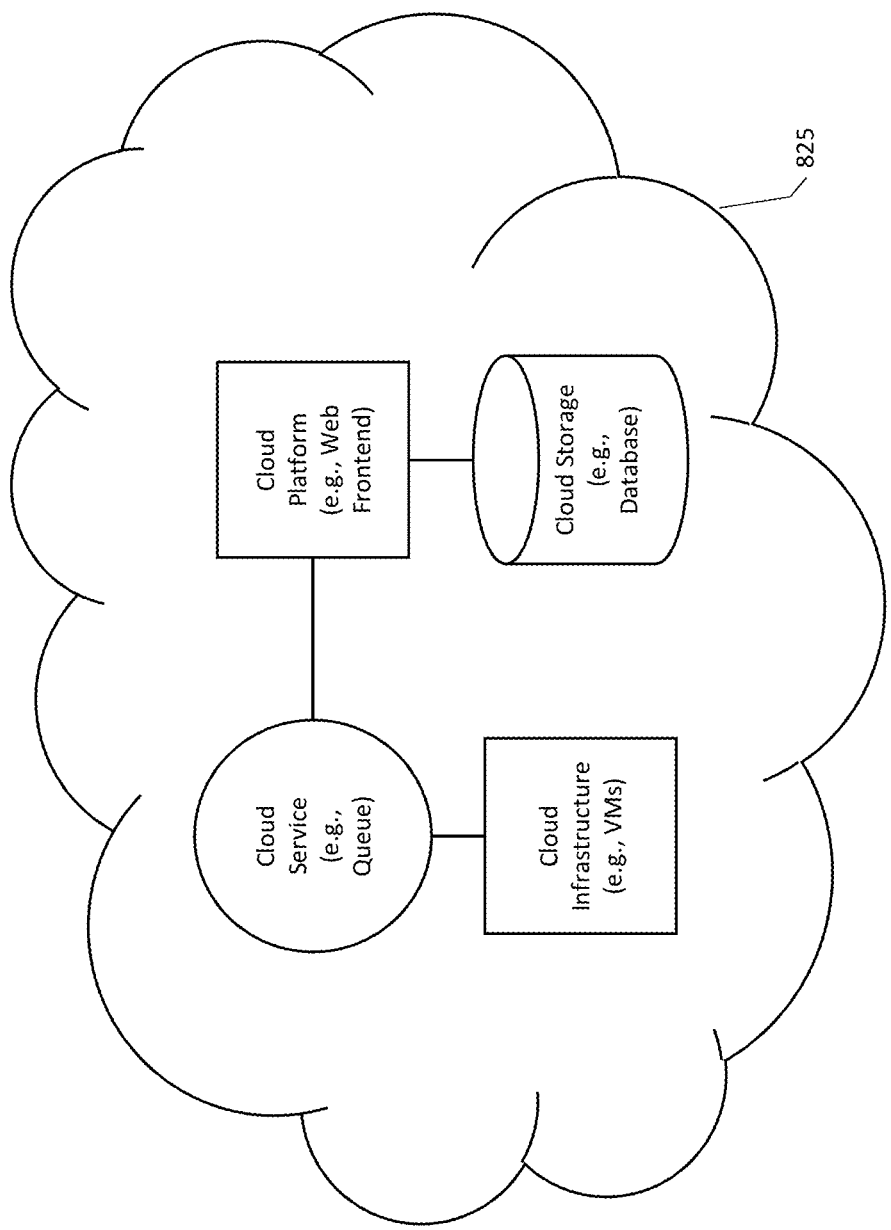
FIGS. 9 and 10 are diagrams illustrating two exemplary implementations of cloud computing architecture/aspects with respect to which the disclosed technology may be specifically configured to operate, in accordance with certain embodiments of the present disclosure.

As also shown in FIGS. 8 and 9, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 10:
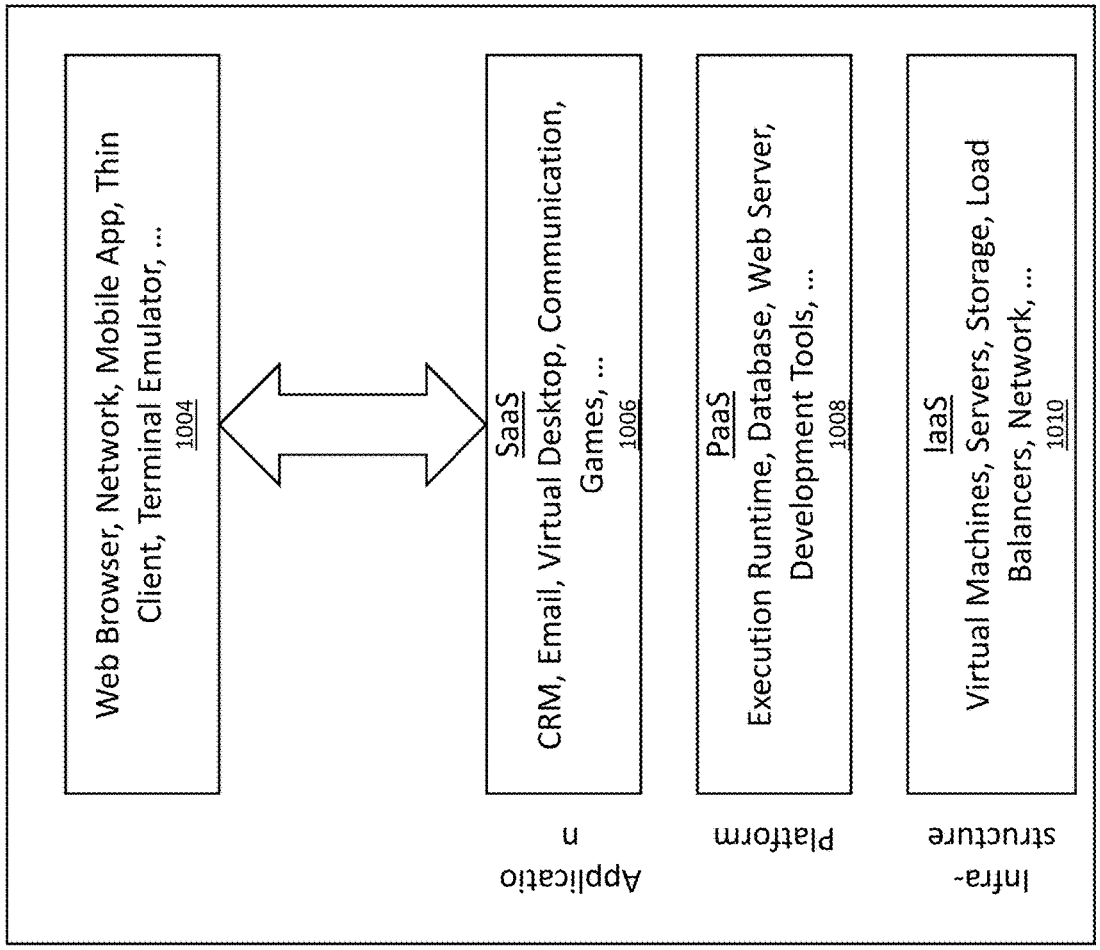

According to some embodiments shown by way of one example in FIG. 10, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 1010, platform as a service (PaaS) 1008, and/or software as a service (SaaS) 1006. FIGS. 9 and 10 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the web browser and network aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A computer-implemented method comprising:
   providing, by at least one computer, a portal comprising user interfaces and a plurality of input fields configured to receive inputs from members of an organization regarding requests for member participation in events and processing information related to the member participation that enables the organization to: (i) assemble graphical information and insights used in approving requests, and (ii) track benefits of the member participation for both the members and the organization;
   retrieving, by the at least one computer, for each of the forms, information from the different applications or the different computing platforms that is needed to generate each form;
   reformatting, by the at least one computer, the forms by integrating the information retrieved into HTML elements and thereby generating reformatted forms that do not access the different applications or the different computing platforms;
   embedding, by the at least one computer, the reformatted forms within the portal such that the portal serves as a single unified interface that provides the forms in a directly usable format without any links to the different applications or the different computing platforms;
   generating, by the at least one computer, as part of the portal, an intake request dashboard for the members comprising:
   (i) an intake form with one or more first input fields comprising UI elements by which a member may provide identifying information regarding: an event in which the member seeks to participate, a location of the event, and a date range for the event; and
   (ii) a common characteristics estimator tool comprising one or more second input fields configured to receive common characteristic information for: a first characteristic related to attending the conference, a second characteristic related to travel to and/or from the conference, and a third characteristic related to lodging associated with the conference; and
   generating, by the at least one computer, as part of the portal, an approver dashboard that provides, to an approver, one or more of: the identifying information, the cost information, at least one UI tool that enables the approver to automatically reformat and integrate data from other applications within the organization for display in the approver dashboard, and a UI mechanism to approve the intake request;

wherein the approver dashboard is configured to display graphical information to the approver regarding the intake request, the graphical information comprising:
  (i) first graphical indicia that displays first information regarding into which groups or departments of the organization subject event requests fall;
  (ii) second graphical indicia that displays, for the previously-granted requests, which skills of the members are being developed by participating in the events associated with the subject event requests;
  (iii) third graphical indicia that provides a visual display of the status of the pending intake requests; and
  (iv) a user interface for tracking intake requests, the user interface displaying status of pending intake requests from the members.

2. The method of clause 1 or of any clause herein, wherein the common characteristics comprise one or more cost-related characteristics.

3. The method of clause 1 or any clause herein, further comprising:
  reformatting the forms from other applications such that the forms: (i) pass permissions existing between the other applications and the portal, and (ii) maintain consistent content upon passing though defense systems in place between the other applications and the portal; and
  integrating the reformatted forms into the platform.

4. The method of clause 1 or any clause herein, wherein the one or more input fields of the intake form further comprise UI elements by which the member may provide one or more of: a name and/or other identifying information regarding the member, a manager or accountable person within the organization for the member or the request, an approver who is responsible for approving the request, group or other affiliation information of the member with the organization, a reason or basis to attend, and a skill that the member would be developing at the event.

5. The method of clause 1 or any clause herein, further comprising:
  generating, by the at least one computer, as part of the portal, a manager dashboard that is utilized by manager to review the intake request submitted by the member and submit the intake request to the approved dashboard for approval.

6. The method of clause 1 or any clause herein, wherein the cost estimator tool is configured to transform cost information submitted by the member into graphical indicia that is visually provided to an approver via the approver dashboard.

7. The method of clause 1 or any clause herein, wherein the at least one UI tool that enables the approver to automatically reformat and integrate data from other applications within the organization for display in the approver dashboard comprises a first UI tool that provides geographical insights from the organization regarding locations or regions on which the organization is directing resources, and wherein the approver dashboard is configured to display the geographical insights, in connection with the locations of the events at which participation is being requested by the members, for visual comparison or analysis by the approver.

8. The method of clause 1 or any clause herein, the at least one UI tool that enables the approver to automatically reformat and integrate data from other applications within the organization for display in the approver dashboard comprises a second UI tool that provides line-of-business insights from the organization regarding lines of business to which the organization is directing resources, and wherein the approver dashboard is configured to display the line-of-business insights, in connection with the skills of the members being developed by participating in the events, for visual comparison or analysis by the approver.

9. The method of clause 1 or any clause herein, wherein the member participation comprises one or both of attending the event and speaking at the event, and the intake request dashboard comprises a participation role input that enables the member to specify whether the member will attend the event or speak at the event.

10. The method of clause 1 or any clause herein, wherein the events comprise one or both of conferences and training programs, and the intake request dashboard comprises an event type input that enables the member to specify whether the event is a conference or a training program.

11. A computer-implemented method comprising:
  providing, by at least one computer, a portal comprising user interfaces and a plurality of input fields configured to receive inputs from members of an organization regarding requests for member participation in events and processing information related to the member participation that enables the organization to: (i) assemble graphical information and insights used in approving requests, and (ii) track benefits of the member participation for both the members and the organization;
  utilizing, by the at least one computer, iframes in the portal to integrate forms from different applications within the organization that have different computing platforms, wherein the iframes enable the forms to be directly embedded within the portal without direct linking to the different computing platforms;
  generating, by the at least one computer, as part of the portal, an intake request dashboard for the members comprising:
    (i) an intake form with one or more first input fields comprising UI elements by which a member may provide identifying information regarding: an event in which the member seeks to participate, a location of the event, and a date range for the event;
    (ii) a cost estimator tool comprising one or more second input fields configured to receive cost information for: registration cost to attend the conference, travel cost for travel to and from the conference, and lodging cost to attend the conference;
  generating, by the at least one computer, as part of the portal, a manager dashboard that is utilized by manager to review the intake request submitted by the member and submit the intake request to the approved dashboard for approval; and
  generating, by the at least one computer, as part of the portal, an approver dashboard that: provides the identifying information to an approver, provides the cost information to the approver, provides at least one UI tool that enables the approver to integrate other data or insights from the organization into the approver dashboard, and provides a UI mechanism to approve the intake request;
  wherein the approver dashboard is configured to display graphical information to the approver regarding the intake request, the graphical information comprising:
    (i) first graphical indicia that displays first information regarding into which groups or departments of the organization subject event requests fall;
    (ii) second graphical indicia that displays, for the previously-granted requests, which skills of the members are being developed by participating in the events associated with the subject event requests;
    (iii) a user interface for tracking intake requests, the user interface displaying status of pending intake requests from the members; and (iv) third graphical indicia that provides a visual display of the status of the pending intake requests.

12. The method of clause 11 or any clause herein, wherein the forms from other applications are integrated into the platform by reformatting the forms such that the forms pass permissions existing between the other applications and the portal and maintain consistent content upon passing though defense systems in place between the other applications and the portal.

13. The method of clause 11 or any clause herein, wherein the identifying information of the event provided via the one or more first input fields of the intake form comprises one or more of: a name of the event, a website associated with the event, a summary or description of the event, and whether the member will attend the event or speak at the event.

14. The method of clause 11 or any clause herein, wherein the one or more input fields of the intake form further comprise UI elements by which the member may provide one or more of: a name and/or other identifying information regarding the member, a manager or accountable person within the organization for the member or the request, an approver who is responsible for approving the request, group or other affiliation information of the member with the organization, a reason or basis to attend, and a skill that the member would be developing at the event.

15. The method of clause 11 or any clause herein, wherein the cost estimator tool is configured to transform cost information submitted by the member into graphical indicia that is visually provided to an approver via the approver dashboard.

16. The method of clause 11 or any clause herein, wherein the at least one UI tool that enables the approver to automatically reformat and integrate data from other applications within the organization for display in the approver dashboard comprises a first UI tool that provides geographical insights from the organization regarding locations or regions on which the organization is directing resources, and wherein the approver dashboard is configured to display the geographical insights, in connection with the locations of the events at which participation is being requested by the members, for visual comparison or analysis by the approver.

17. The method of clause 11 or any clause herein, the at least one UI tool that enables the approver to automatically reformat and integrate data from other applications within the organization for display in the approver dashboard comprises a second UI tool that provides line-of-business insights from the organization regarding lines of business to which the organization is directing resources, and wherein the approver dashboard is configured to display the line-of-business insights, in connection with the skills of the members being developed by participating in the events, for visual comparison or analysis by the approver.

18. The method of clause 11 or any clause herein, wherein the member participation comprises one or both of attending the event and speaking at the event, and the intake request dashboard comprises a participation role input that enables the member to specify whether the member will attend the event or speak at the event.

19. The method of clause 11 or any clause herein, wherein the events comprise one or both of conferences and training programs, and the intake request dashboard comprises an event type input that enables the member to specify whether the event is a conference or a training program.

20. A computer-implemented method comprising:
    providing, by at least one computer, a portal comprising user interfaces and a plurality of input fields configured to receive inputs from members of an organization regarding requests for member participation in events and processing information related to the member participation that enables the organization to: (i) assemble graphical information and insights used in approving requests, and (ii) track benefits of the member participation for both the members and the organization;
    utilizing, by the at least one computer, iframes in the portal to integrate forms from different applications within the organization that have different computing platforms, wherein the iframes enable the forms to be directly embedded within the portal without direct linking to the different computing platforms;
    generating, by the at least one computer, as part of the portal, an intake request dashboard for the members comprising:
        (i) an intake form with one or more first input fields comprising UI elements by which a member may provide identifying information regarding: an event in which the member seeks to participate, a location of the event, and a date range for the event; and
        (ii) a cost estimator tool comprising one or more second input fields configured to receive cost information for: registration cost to attend the conference, travel cost for travel to and from the conference, and lodging cost to attend the conference; and
    generating, by the at least one computer, as part of the portal, an approver dashboard that provides, to an approver, one or more of: the identifying information, the cost information, at least one UI tool that enables the approver to automatically reformat and integrate data from other applications within the organization for display in the approver dashboard, and a UI mechanism to approve the intake request;
    wherein the approver dashboard is configured to display graphical information to the approver regarding the intake request, the graphical information comprising:
        (i) first graphical indicia that displays first information regarding into which groups or departments of the organization subject event requests fall;
        (ii) second graphical indicia that displays, for the previously-granted requests, which skills of the members are being developed by participating in the events associated with the subject event requests;
        (iii) third graphical indicia that provides a visual display of the status of the pending intake requests; and
        (iv) a user interface for tracking intake requests, the user interface displaying status of pending event requests from the members.

21. The method of clause 20 or any clause herein, wherein the step of utilizing iframes in the portal to integrate forms from different applications comprises:
    retrieving, by the at least one computer, for each of the forms, information from the different applications or the different computing platforms that is needed to generate each form;
    reformatting, by the at least one computer, the forms by integrating the information retrieved into HTML elements and thereby generating reformatted forms that do not access the different applications or the different computing platforms; and
    embedding, by the at least one computer, the reformatted forms within the portal such that the portal serves as a single unified interface that provides the forms in a directly usable format without any links to the different applications or the different computing platforms.

22. Embodiments herein may also take the form of a system comprised of computing elements that are arranged, programmed and/or otherwise adapted to perform the features and functionality set forth anywhere above.

23. In addition, embodiments herein may also take the form of one or more computer readable media containing computer-executable instructions for performing any of the processing herein, the computer-executable instructions being executable via one or more processing components to process instructions and/or perform one or more aspects of the functionality set forth herein.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method comprising:
providing, by at least one computer, a portal comprising user interfaces and a plurality of input fields configured to receive inputs from members of an organization regarding requests for member participation in events and processing information related to the member participation that enables the organization to: (i) assemble graphical information and insights used in approving the requests, and (ii) track benefits of the member participation for both the members and the organization;
directly embedding, in the portal, forms from different applications within the organization that have different computing platforms, without any direct links to the different computing platforms;
retrieving, by the at least one computer, for each of the forms, information from different applications or different computing platforms that is needed to generate each form;
reformatting, by the at least one computer, the forms by integrating the information retrieved into HTML elements and thereby generating reformatted forms that do not access the different applications or the different computing platforms;
embedding, by the at least one computer, the reformatted forms within the portal such that the portal serves as a single unified interface that provides the forms in a directly usable format without any links to the different applications or the different computing platforms;
generating, by the at least one computer, as part of the portal, an intake request dashboard for the members comprising:
 (i) an intake form with one or more first input fields comprising UI elements by which a member provides identifying information regarding: an event in which the member seeks to participate, a location of the event, and a date range for the event; and
 (ii) a common characteristics estimator tool comprising one or more second input fields configured to receive common characteristic information for: a first characteristic related to attending a conference, a second characteristic related to travel to and/or from the conference, and a third characteristic related to lodging associated with the conference; and
generating, by the at least one computer, as part of the portal, an approver dashboard that provides, to an approver, one or more of: the identifying information, cost information, at least one UI tool that is configured to automatically reformat and integrate data from other applications within the organization for display in the approver dashboard, and a UI mechanism to approve an intake request;
wherein the approver dashboard is configured to display graphical information to the approver regarding the intake request, the graphical information comprising:
 (i) first graphical indicia that displays first information regarding into which groups or departments of the organization subject event requests fall;
 (ii) second graphical indicia that displays, for the requests that have been previously-granted, which skills of the members are being developed by participating in the events associated with the subject event requests;
 (iii) third graphical indicia that provides a visual display of status of pending intake requests; and
 (iv) a user interface for tracking intake requests, the user interface displaying status of the pending intake requests from the members.

2. The method of claim 1 wherein the common characteristics comprise one or more cost-related characteristics.

3. The method of claim 1 further comprising:
reformatting the forms from other applications such that the forms: (i) pass permissions existing between the other applications and the portal, and (ii) maintain consistent content upon passing though defense systems in place between the other applications and the portal; and
integrating the reformatted forms into the platform.

4. The method of claim 1 wherein the one or more input fields of the intake form further comprise UI elements by which the member provides one or more of: a name and/or other identifying information regarding the member, a manager or accountable person within the organization for the member or the request, an approver who is responsible for approving the request, group or other affiliation information of the member with the organization, a reason or basis to attend, and a skill that the member would be developing at the event.

5. The method of claim 1 further comprising:
generating, by the at least one computer, as part of the portal, a manager dashboard that is utilized by manager to review the intake request submitted by the member and submit the intake request to the approved dashboard for approval.

6. The method of claim 1 wherein the cost estimator tool is configured to transform cost information submitted by the member into graphical indicia that is visually provided to an approver via the approver dashboard.

7. The method of claim 1, wherein the at least one UI tool that enables the approver to automatically reformat and integrate data from other applications within the organization for display in the approver dashboard comprises a first UI element that provides geographical insights from the organization regarding locations or regions on which the organization is directing resources, and wherein the approver dashboard is configured to display the geographical insights, in connection with the locations of the events at which participation is being requested by the members, for visual comparison or analysis by the approver.

8. The method of claim 1, the at least one UI tool that enables the approver to automatically reformat and integrate data from other applications within the organization for display in the approver dashboard comprises a second UI element that provides line-of-business insights from the organization regarding lines of business to which the organization is directing resources, and wherein the approver dashboard is configured to display the line-of-business insights, in connection with the skills of the members being developed by participating in the events, for visual comparison or analysis by the approver.

9. The method of claim 1, wherein the member participation comprises one or both of attending the event and speaking at the event, and the intake request dashboard comprises a participation role input that enables the member to specify whether the member will attend the event or speak at the event.

10. The method of claim 1, wherein the events comprise one or both of conferences and training programs, and the intake request dashboard comprises an event type input that enables the member to specify whether the event is a conference or a training program.

11. A computer-implemented method comprising:
providing, by at least one computer, a portal comprising user interfaces and a plurality of input fields configured to receive inputs from members of an organization regarding requests for member participation in events and processing information related to the member participation that enables the organization to: (i) assemble graphical information and insights used in approving requests, and (ii) track benefits of the member participation for both the members and the organization;
utilizing, by the at least one computer, iframes in the portal to integrate forms from different applications within the organization that have different computing platforms, wherein the iframes enable the forms to be directly embedded within the portal without direct linking to the different computing platforms;
generating, by the at least one computer, as part of the portal, an intake request dashboard for the members comprising:
(i) an intake form with one or more first input fields comprising UI elements by which a member provides identifying information regarding: an event in which the member seeks to participate, a location of the event, and a date range for the event;
(ii) a cost estimator tool comprising one or more second input fields configured to receive cost information for: registration cost to attend a conference, travel cost for travel to and from the conference, and lodging cost to attend the conference;
generating, by the at least one computer, as part of the portal, a manager dashboard that is utilized by manager to review the intake request submitted by the member and submit the intake request to the approved dashboard for approval; and
generating, by the at least one computer, as part of the portal, an approver dashboard that: provides the identifying information to an approver, provides the cost information to the approver, provides at least one UI tool configured to enable the approver to integrate other data or insights from the organization into the approver dashboard, and provides a UI mechanism to approve the intake request;
wherein the approver dashboard is configured to display graphical information to the approver regarding the intake request, the graphical information comprising:
(i) first graphical indicia that displays first information regarding into which groups or departments of the organization subject event requests fall;
(ii) second graphical indicia that displays, for the previously-granted requests, which skills of the members are being developed by participating in the events associated with the subject event requests;
(iii) a user interface for tracking intake requests, the user interface displaying status of pending intake requests from the members; and
(iv) third graphical indicia that provides a visual display of the status of the pending intake requests.

12. The method of claim 11 wherein the forms from other applications are integrated into the platform by reformatting the forms such that the forms pass permissions existing between the other applications and the portal and maintain consistent content upon passing though defense systems in place between the other applications and the portal.

13. The method of claim 11 wherein the identifying information of the event provided via the one or more first input fields of the intake form comprises one or more of: a name of the event, a website associated with the event, a summary or description of the event, and whether the member will attend the event or speak at the event.

14. The method of claim 11 wherein the one or more input fields of the intake form further comprise UI elements by which the member provides one or more of: a name and/or other identifying information regarding the member, a manager or accountable person within the organization for the member or the request, an approver who is responsible for approving the request, group or other affiliation information of the member with the organization, a reason or basis to attend, and a skill that the member would be developing at the event.

15. The method of claim 11 wherein the cost estimator tool is configured to transform cost information submitted by the member into graphical indicia that is visually provided to an approver via the approver dashboard.

16. The method of claim 11, wherein the at least one UI tool that enables the approver to automatically reformat and integrate data from other applications within the organization for display in the approver dashboard comprises a first UI element that provides geographical insights from the organization regarding locations or regions on which the organization is directing resources, and wherein the approver dashboard is configured to display the geographical insights, in connection with the locations of the events at which participation is being requested by the members, for visual comparison or analysis by the approver.

17. The method of claim 11, the at least one UI tool that enables the approver to automatically reformat and integrate data from other applications within the organization for display in the approver dashboard comprises a second UI element that provides line-of-business insights from the organization regarding lines of business to which the organization is directing resources, and wherein the approver dashboard is configured to display the line-of-business insights, in connection with the skills of the members being developed by participating in the events, for visual comparison or analysis by the approver.

18. The method of claim 11, wherein the member participation comprises one or both of attending the event and speaking at the event, and the intake request dashboard comprises a participation role input that enables the member to specify whether the member will attend the event or speak at the event.

19. The method of claim 11, wherein the events comprise one or both of conferences and training programs, and the intake request dashboard comprises an event type input that enables the member to specify whether the event is a conference or a training program.

20. The method of claim 12, wherein the at least one UI tool that enables the approver to automatically reformat and integrate data from other applications within the organization for display in the approver dashboard comprises a first UI element that provides geographical insights from the organization regarding locations or regions on which the organization is directing resources, and wherein the approver dashboard is configured to display the geographical insights, in connection with the locations of the events at which participation is being requested by the members, for visual comparison or analysis by the approver.

\* \* \* \* \*